US 6,624,870 B1

(12) United States Patent
Greene et al.

(10) Patent No.: US 6,624,870 B1
(45) Date of Patent: *Sep. 23, 2003

(54) DESIGN FEATURES OPTIMIZED FOR TILED FLAT-PANEL DISPLAYS

(75) Inventors: Raymond G. Greene, Ovid, NY (US); Donald P. Seraphim, Vestal, NY (US); Dean W. Skinner, Vestal, NY (US); Boris Yost, Ithaca, NY (US)

(73) Assignee: Rainbow Displays, Inc., Endicott, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/075,945

(22) Filed: Feb. 13, 2002

Related U.S. Application Data

(62) Division of application No. 09/368,921, filed on Aug. 6, 1999, now abandoned.

(51) Int. Cl.[7] .................. G02F 1/133; G02F 1/1339
(52) U.S. Cl. ................................. 349/153; 349/73
(58) Field of Search .................. 349/73, 153, 154, 349/74

(56) References Cited

U.S. PATENT DOCUMENTS 5,661,531 A  8/1997 Greene et al. ............... 349/73
6,018,380 A  * 1/2000 Hu et al. .................... 349/153

* cited by examiner

Primary Examiner—Toan Ton
Assistant Examiner—Dung Nguyen
(74) Attorney, Agent, or Firm—Salzman & Levy; David L. Banner

(57) ABSTRACT

The present invention features designs of pixels and designs of control features for seals on AMLCD tiles optimized for tiling AMLCD flat panel displays (FPDs) which have visually imperceptible seams. The FPD structure has an image view plane which is continuous and remote from the pixel apertures or image source plane on the inside of the tiles. The image is formed on the view plane by a distributed ultra low magnification flies-eye optical system (a screen) that is integrated with the tiles, effectively excluding and obscuring an image of the seams. The innovations described herein minimize the defects on the perimeter pixels by effectively damming the waviness of the front of the seal near the perimeter pixels on the tiles. Dark space required for the seal between the interior tile edges and active regions of the pixels is decreased, as is the space allocated for wiring thereby increasing the feasible aperture ratios near the mosaic edges and all apertures. The tile designs make effective use of the area of an entire manufacturing panel.

34 Claims, 15 Drawing Sheets

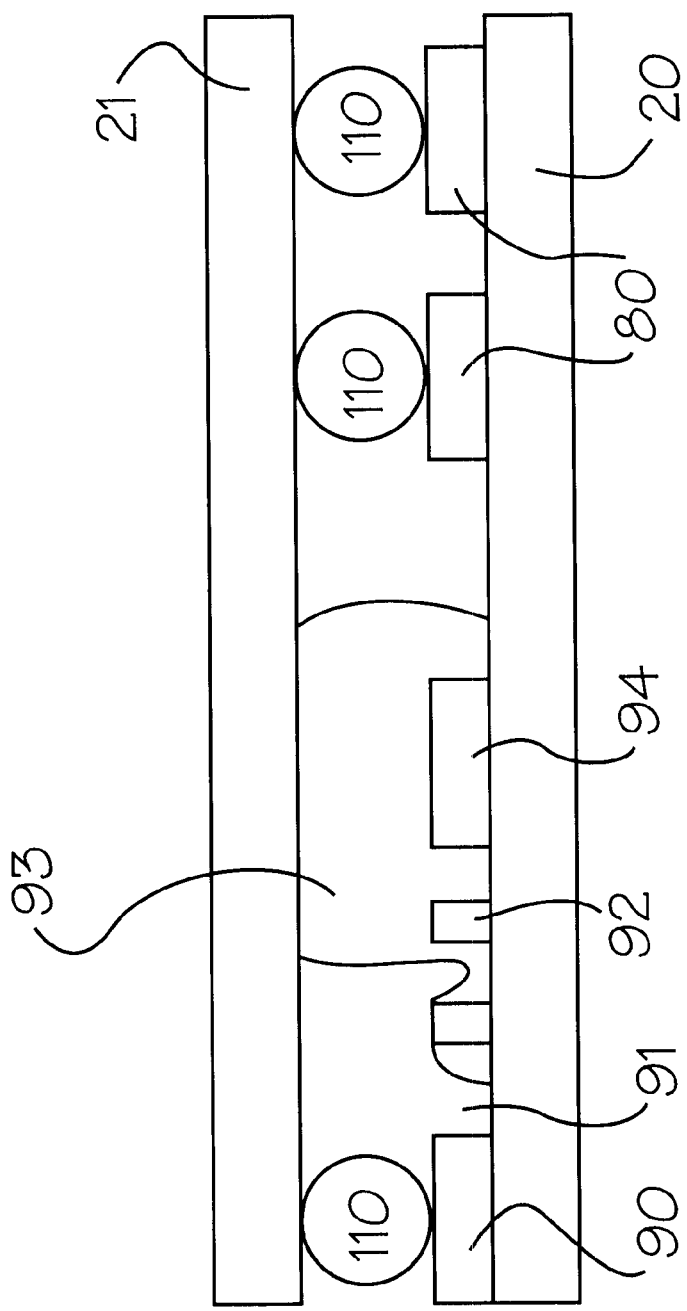

DESIGN FEATURES OPTIMIZED FOR TILED FLAT-PANEL DISPLAYS

RELATED PATENT APPLICATION

This application is a divisional of application Ser. No. 09/368,921 filed Aug. 6, 1999 now abandoned.

The present patent application is related to U.S. Pat. No. 5,661,531 granted Aug. 26, 1997 for TILED FLAT PANEL DISPLAYS, assigned to the common assignee, and hereby incorporated by reference.

FIELD OF THE INVENTION

The invention pertains to flat-panel electronic displays and, more particularly, to large, flat-panel electronic displays that are composed of a plurality of joined, smaller building blocks (tiles) having seams therebetween. The tiles may be viewed as though they were a single, monolithic display (i.e., as a display having visually imperceptible seams).

BACKGROUND OF THE INVENTION

Images on electronic displays are derived from an array of small picture elements known as pixels. In color displays, these pixels comprise three color elements that produce the primary colors: red, blue and green (R, B and G), for example. Usually arranged in rectangular arrays, these pixels can be characterized by a pixel pitch, P, a quantity that measures the spacing of pixels in one direction. A typical, cathode-ray tube (CRT) display used for computer applications has a pixel pitch of 0.3 mm and a pixel array width-:height ratio of 4:3. Typical, standardized arrays in computer displays are comprised of 640×480 (VGA) or 800×600 pixels (SVGA).

Large displays can be constructed of a plurality of adjacent tiles, with each having a single pixel or an array thereof. Such assembled tiled displays contain visually disturbing seams, resulting from the gaps between adjacent pixels on the same and/or adjacent tiles. Such seams may incorporate interconnect adhesives, seals, mechanical alignment means and other components resulting in visible optical discontinuities in displayed images. Some of these structures are described in the aforementioned U.S. Pat. No. 5,661,531. As a consequence, the image portrayed on seamed displays appears segmented and disjointed. Therefore, it is desirable to fabricate tiled, flat-panel displays which do not have noticeable or perceptible seams under the intended viewing conditions.

The pixel pitch in electronic displays must be set so that a continuous image is produced when the display is viewed at distances greater than the minimum viewing distance. For example, with a pixel pitch of P=0.3 mm, the minimum viewing distance is on the order of 1 m. Even though the minimum viewing distance increases in proportion to the pixel pitch, it still limits the pixel pitch for most computer and consumer displays. Since space for the tiling functions must be provided in areas smaller in size than the pixel pitch, it is difficult to develop structures and methods for constructing tiled displays.

Flat-panel displays (FPD) provide the best choice for constructing "seamless", tiled screens. Flat-panel displays include backlighted and self-lighted displays. Liquid crystal displays (LCDs) are the most common backlighted displays.

Flat-panel displays depend on the microfabrication of key components that carry the pixel patterns. Unfortunately, microfabrication techniques are not viable for very large displays currently greater than 20 inches diagonal, due to the fact that manufacturing yield declines rapidly with increasing area of the display. Therefore, the inventors have determined that tiles with arrays of pixels can be microfabricated and then assembled together to form a larger electronic display.

The present invention provides unique designs and methods for achieving such large, seamless, tiled panels for color or gray-scale displays. This invention particularly focuses on displays of the transparent, lightvalve type. In such displays, light from a uniform, backlight source is transmitted through the display assembly and directly viewed from the front side of the display. The lightvalves control the amount of primary light rays transmitted through each of the color elements in the pixels. At a sufficient viewing distance, the viewer's eyes merge the primary light from the pixels to form a continuous image. Because of a number of secondary processes, low-level light emanates from the spaces between the pixels. These phenomena include reflection and light guiding, all of which must be kept to a minimum in order to achieve sufficient brightness and contrast. The spaces between pixels on the same tile, and the spaces between pixels on adjacent tiles have different structures. Consequently, the presence of seams between the pixels at the edge of the tiles affects both primary and secondary light rays, thus increasing the difficulties for constructing seamless, tiled displays.

The inventors have identified three design principles in making large-scale, seamless, flat panels that may be viewed as though they were single monolithic displays: (a) the intra-tile pixel pitch on the view plane for the tiles must be matched to the intertile pixel pitch; (b) the primary light paths through the lightvalves must not be affected by the presence of the seam or any other structures or components used in the tile assembly; (c) the inter-pixel regions must be designed so that intra-tile and inter-tile pixel regions, which have different physical structures, present approximately the same visual appearance to the viewer under transmitted and reflected light. This has largely been accomplished by applying the technology described in U.S. Pat. No. 5,661,531 to fabricated tiled AMLCD functional models. However, design improvements can still be made to increase manufacturing yields and to maximize optical performance of the tiled displays and their component parts, particularly the tiles.

SUMMARY OF THE INVENTION

The present invention describes a tiled, flat-panel display having visually imperceptible seams between tiles disposed in an interior portion thereof, so that the display is perceived by a human observer as a single, monolithic display, when viewed at a distance equal or greater than the intended minimum viewing distance. This invention applies primarily to lightvalve-type, flat-panel displays with a backlight.

The panel comprises an image source plane having spaced-apart pixels with active areas which control the primary-color, light-transmitting elements (e.g., red, blue and green). It should be understood that the primary colors need not be red, blue and green but may be other colors, and not necessarily limited to three. Included in the image source plane may be a color filter (CF) layer. Alternatively, the CF may be included with screen and polarizer outside of the tiles continuous across the mosaic. Surrounding the active area of each pixel is an inactive (dark) area. This dark area can be used for a variety of purposes without affecting the light output and/or visual appearance of the display. For example, electrical circuitry, such as transistors, are situated in the dark spaces. Most importantly, thin, perimeter seals at the edges of the AMLCD tiles may utilize that portion on the dark areas of the pixels adjacent to the edge. Wiring may also be placed in the pixel dark areas, as required.

Each of the pixels is disposed along the image source plane at a given pitch greater than approximately 0.2 mm and preferably 0.98 mm. A plurality of adjacently-disposed tiles is located in the image source plane. The invention includes a number of methods for the design, construction and assembly of tiled displays with invisible seams which are significant compliments to the technique disclosed in U.S. Pat. No. 5,661,531. These can be grouped into the following distinct categories: (1) alteration of the characteristics of the image source plane, (2) preferred positioning of the masks, polarizer and image view plane (screen) to enhance hiding of the seams between tiles, (3) enhancement of the brightness of the display assembly by optimizing the backlight collimation angles, and (4) improvements in color matching between tiles.

BRIEF DESCRIPTION OF THE DRAWINGS

A complete understanding of the present invention may be obtained by reference to the accompanying drawings, when considered in conjunction with the subsequent detailed description, in which:

FIG. 10 is an illustration of the seal flow after squeeze of the CF substrate to the TFT substrate with spacer balls determining the cell gap therebetween;

FIG. 11c is a detailed, schematic view of a narrow-seal (non fill port) corner of the composite color filter shown in FIG. 11a;

DESCRIPTION OF THE PREFERRED EMBODIMENTS

Generally speaking, the present invention features a tiled, flat-panel, color display that is visually seamless under the intended viewing conditions. The seams become effectively invisible when they do not produce image segmentation, and their brightness, color and texture appear equal to the spaces between the lightvalves residing on the same tile. A number of techniques are described that affect the design, construction and assembly of the tiled display, making the display appear seamless.

Figure 1:
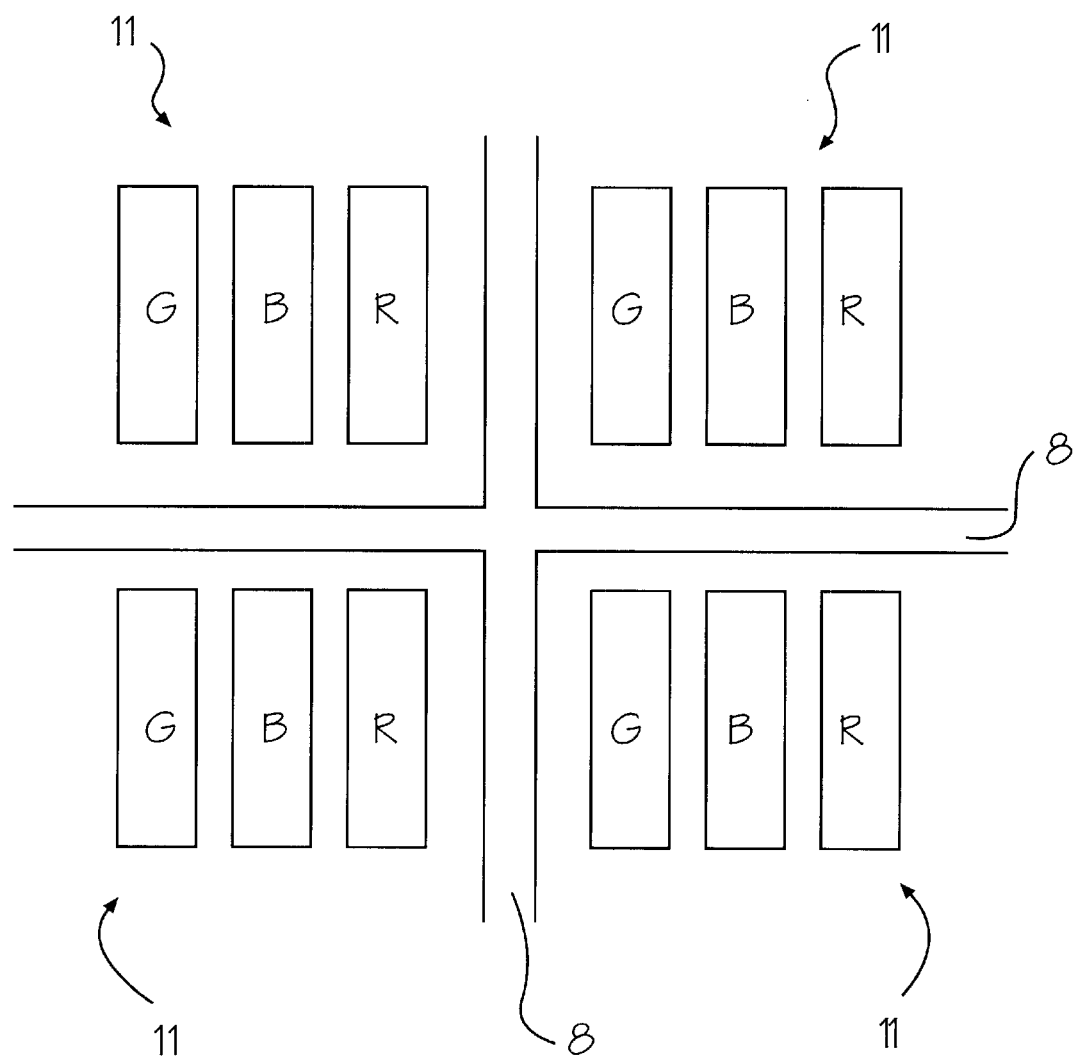
FIG. 1 shows a schematic, plan view of a typical, tiled, prototype array of pixels in a color, electronic display, in accordance with this invention.

FIG. 1 shows a schematic, plan view of a typical, tiled display having arrays of pixels 11 arranged into tiles with seams 8 therebetween. Each of the arrays of pixels 11 comprises primary color elements R, B and G (red, blue and green) in the preferred embodiments. The number and selection of the primary colors is not limited to this set, however.

Figure 2:
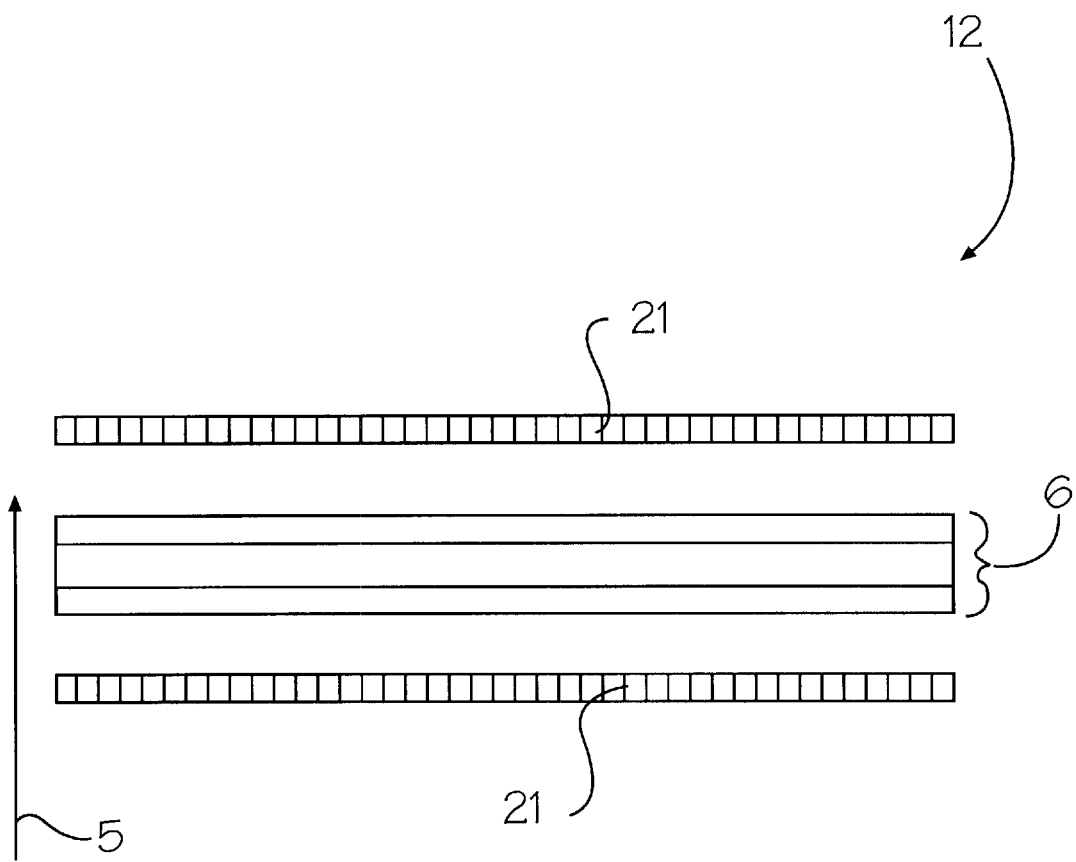
FIG. 2 illustrates a schematic, cross-sectional view of a lightvalve used in a flat-panel display with a backlight (not shown)
Figure 3:
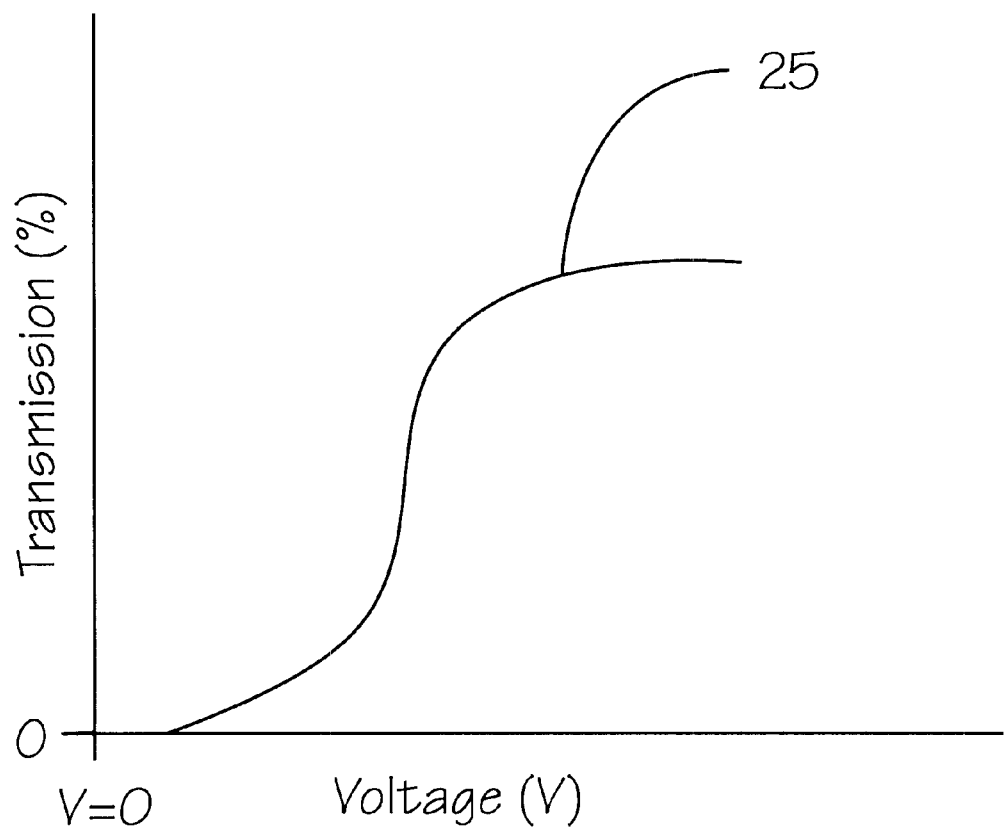
FIG. 3 depicts a graph of a typical light transmission voltage curve for a lightvalve in an active matrix liquid-crystal display.

Referring to FIG. 2, a cross-sectional view of a typical lightvalve 12 used in flat-panel displays is illustrated. In a flat-panel, liquid-crystal display (LCD), light is generated in a separate backlight assembly, not shown, and projected (arrow 5) through the lightvalve 12 towards the viewer, not shown. The lightvalve 12 is formed by two polarizer sheets placed on opposite sides of an optically-active, liquid-crystal layer 6. Light passing from the backlight through the lower polarizer sheet 21 becomes linearly polarized. When an electric field is applied to the liquid-crystal layer 6, it turns the plane of polarization of the transmitted light 5 by an amount that monotonically increases with the magnitude of the applied electric field. The top polarizer layer 21 lets pass only the polarization component of the light that is parallel to its polarization plane. By varying the magnitude of the applied voltage, the light valve 12 thus modulates the intensity of the transmitted light in a continuous fashion, from fully off to fully on. A typical, light-transmission, applied-voltage curve for LCD materials used in active matrix liquid-crystal displays (AMLCDs) is depicted in FIG. 3.

Figure 4:
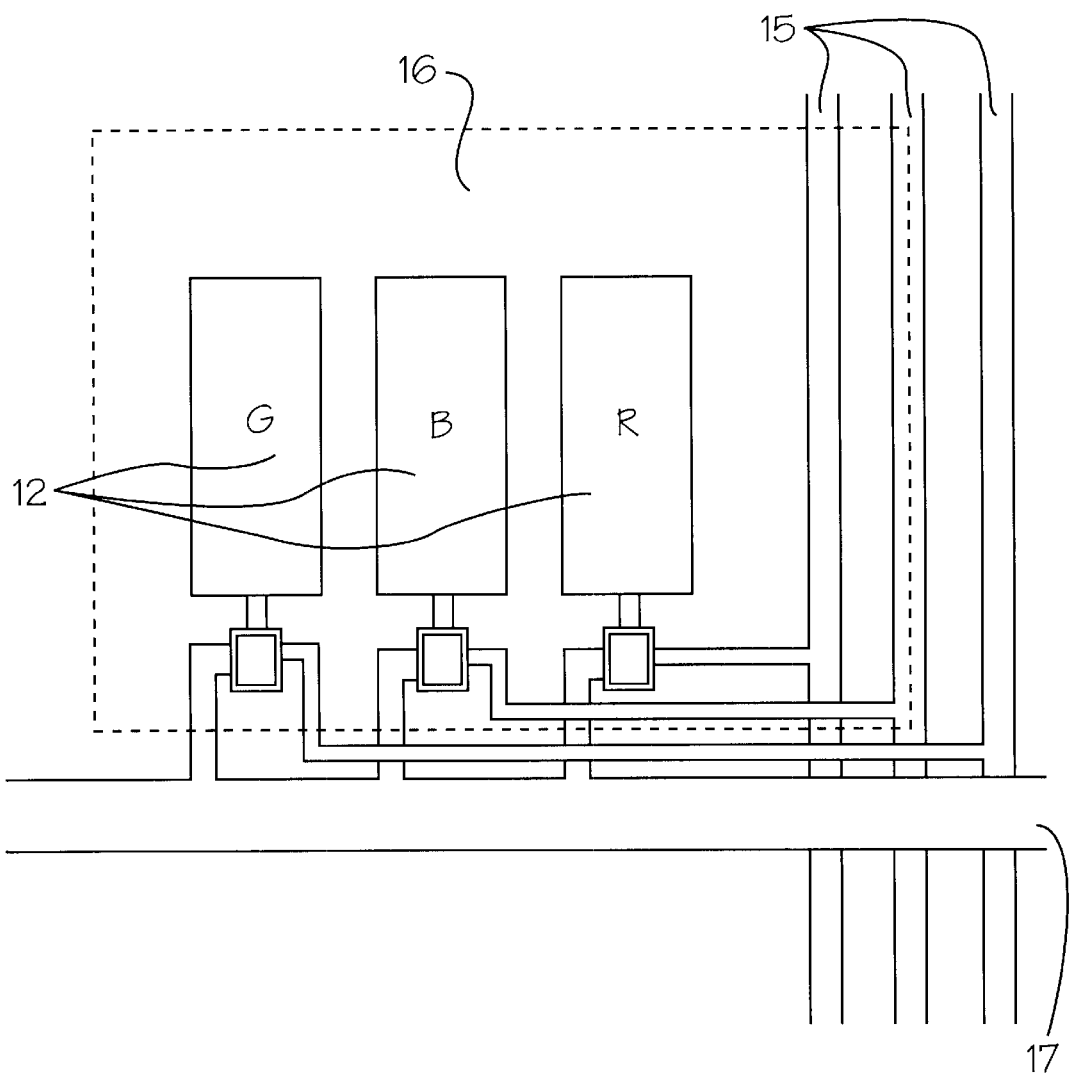
FIG. 4 shows a schematic diagram of a color pixel with three lightvalves, three column lines and one row line for the selection of each color valve, including devices for activating the lightvalves.

Referring to FIG. 4, single lightvalves 12 are shown covering a pixel area 16 for color display applications. In a conventional AMLCD, the lightvalves 12 comprises a thin film transistor (TFT) and a storage capacitor, in addition to the liquid-crystal cell, the transparent electrodes and the polarizers. The TFT is used as the active non-linear device, in combination with row 17 and column 15 lines to achieve matrix addressing of all pixels in the display.

Figure 5:
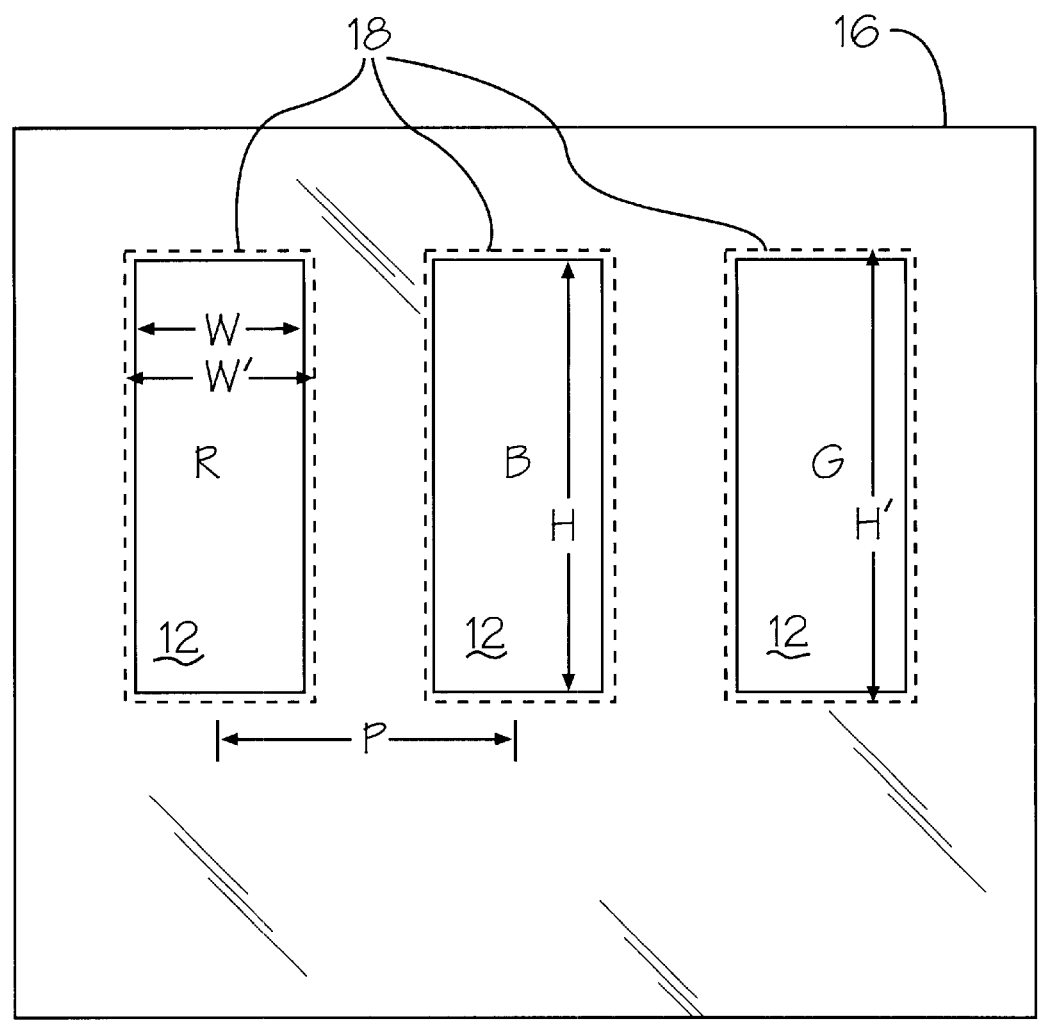
FIG. 5 illustrates the floor plan of a color pixel with three lightvalves, matching color filters with dark space surrounding the sub-pixels.

In electronic color displays, separately controlled lightvalves 12 are placed in the pixel 16, as shown in FIG. 5. One color element is assigned to each of the primary colors. A color filter layer 18 is placed on top of the lightvalves 12 into the pixel 16. Light having the desired wavelength spectrum corresponding to only one of the color it filter regions 18 passes through the lightvalve 12 and the aligned color filter layer 18.

Assume that the dimensions of each of the apertures is W×H, as shown in FIG. 5. The W dimension is somewhat smaller than the pitch P, divided by 3 for color displays (FIG. 5). H is also somewhat smaller than P. A further fraction of this light passes through the second matching aperture defined in the color filter layer 18 (FIG. 5), with the given dimensions of W'×H', where W'>W, and H'>H, in order to allow for misalignment during assembly.

A tiled lightvalve assembly as described above is shown in FIG. 6 in cross-section. It consists of tile components 19, bottom plate 20, with thin film TFT structures 24, and a second tile component, top plate 21, containing the color filter described above and dark spaces 30. These are enclosed by the glass cover plate 22 and glass back plate 26, and masks 23. The lightvalve apertures 18 form the actual image source plane of the display in this preferred assembly, while the screen 25 which forms the view plane is external to the glass cover plate 22 and polarizer sheet 21. Other positions for screens, masks and polarizers presented in the sequence to the light are also effective for tiled displays. For example, the screen may be on either side of the mask on the bottom surface of the cover plate with the polarizer positioned between these components and the tiles. Also, the polarizer and the back plate may be on either side of the mask.

The color filter layer 18 in this preferred embodiment is inserted on the topside of the LCD fill material into close proximity of the image source plane in all conventional LCDs, in order to avoid parallax. Typically, the thickness of the LCD layer is less than 10 m. However, if collimated or partially collimated light is used, the color filter layer 18 may be located alternatively further from the image source plane, for example, on the cover plate below the screen. The typical glass sheet thickness used in LCDs is between 0.7 and 1.1 mm. The tile component glass sheets 20 and 21 carry the transparent electrodes in their thin-film layers and usually comprise indium-tin-oxide material (ITO). The lower glass plate 20 usually carries the X-Y interconnect for matrix addressing, in addition to the non-linear TFT control devices and the storage capacitors for the lightvalves, for image stabilization. The upper glass sheet 21 carries another transparent electrode and the patterned color filter layer 18. The backlight acts as a diffuse source, with light rays emanating into the full half-space above the source. A fraction of this light passes through the aperture of a lightvalve in a specific pixel defined in the thin film layer 24.

Figure 6:
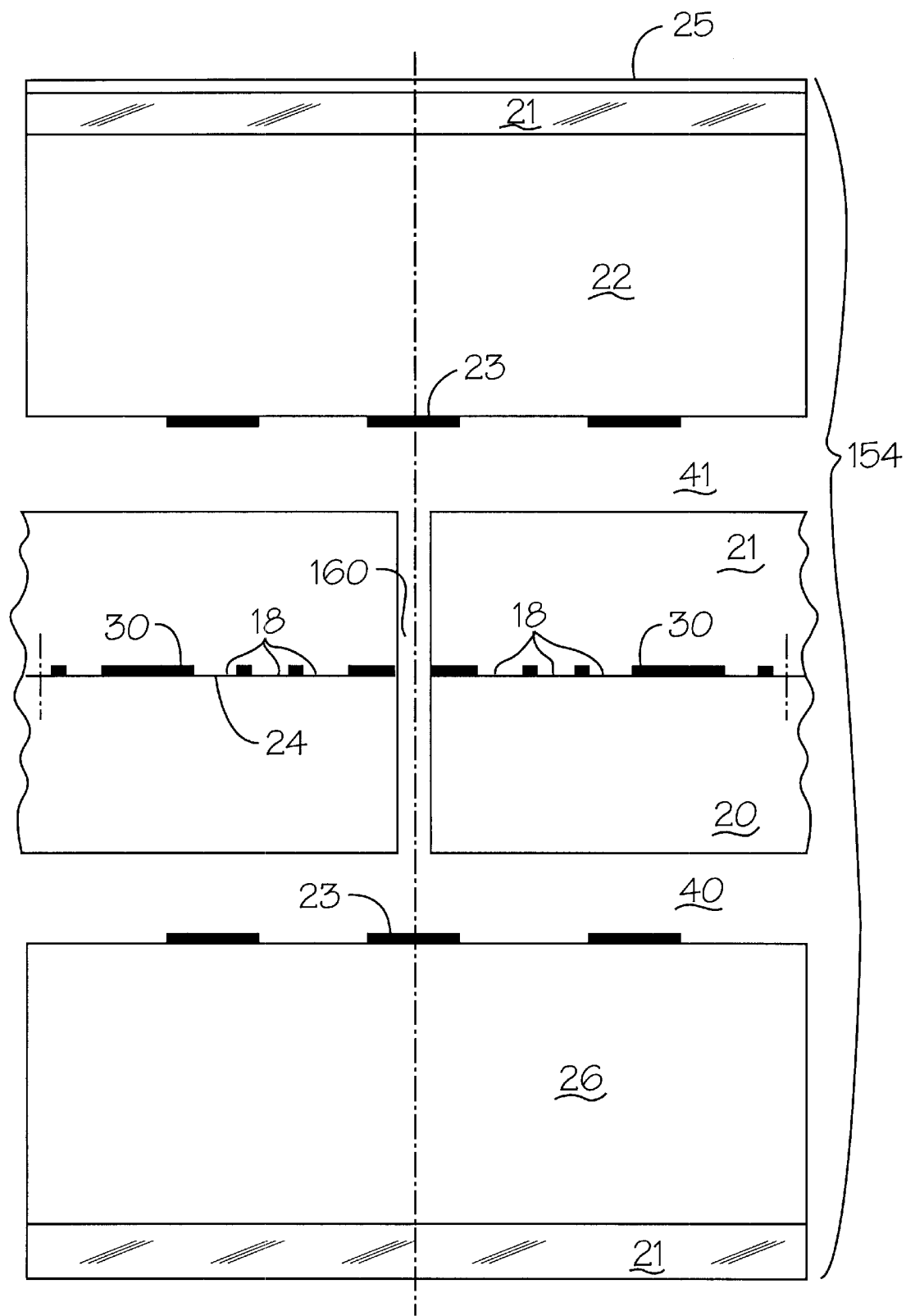
FIG. 6 is a schematic, cross-sectional diagram of pixels with three lightvalves for an active matrix liquid-crystal tiled color display near a seam with cover and back plate, polarizers, masks, and screen.

The spacing d between these two thin film apertures is determined by the optical design of the display, with the optical path length through the liquid-crystal layer being the primary factor. The spacing d is always much smaller than W or H, FIG. 5, and is typically about 5 m for an AMLCD. As a consequence of the very small aspect ratio d:W, a very wide, angular range of light rays can pass through the display stack 154 (FIG. 6). For a conventional AMLCD with pixel width P=300 m for the three subpixels and pixel pitch in the range of 400 m, and d=5 m, the limiting rays form angles of greater than 75° with the surface normal of the display. Therefore, light normally spreads in the top glass plate over a wide lateral distance, overlapping several other pixels. Only an angle of 15.2° normal to the surface is required for a 1.1 mm-thick top plate 21 for the light to reach the adjacent pixel with the above, sample parameters in conventional, non-tiled, AMLCD displays.

In addition to these two apertures, reflection and refraction processes take place at each optical interface where the refractive index changes or a reflective material is encountered. For a glass-to-air interface, with refractive indices of 1.5 and 1.0, for example, the angle for total internal reflection is 56.3°. Therefore, the limiting primary rays escaping from the display stack towards the viewer are not limited by the aspect ratio of the aperture, but by total internal reflection. Nevertheless, the permissible angles for the limiting rays are much larger than the angle required to overlap adjacent pixels.

A great number of secondary light rays traverse, in the transparent glass stack, in addition to the primary rays originating from the backlight and passing through the lightvalves. When diffuse light emanating from the backlight is passed through the glass stack, it undergoes optical refraction and reflection processes, including lateral reflective and refractive waveguiding. These processes redistribute the secondary rays in the glass stack, so that some light is transmitted through all points of the display outside the primary rays controlled by the lightvalve apertures. Secondary rays, in combination with ambient light entering the display from the top surface, form background light that influences the contrast of the display. In order to maximize the contrast, the intensity of secondary rays must be minimized. Contrast ratios as large as 100:1 have been demonstrated in state-of-the-art AMLCDs.

The range of perception thresholds for image segmentation and discrimination of brightness and color differences are determined by a human observer, as described in detail hereinbelow.

Monolithic displays are laterally uniform, and secondary light does not pose any special optical problems, apart from the edge pixels that can be extended and covered over. In tiled displays, however, the situation is completely different. The structure abruptly changes at the seam of each tile. Therefore, both primary and secondary rays are affected by the presence of a seam, and any seam is generally visible unless it is significantly modified. The visibility of the seam can be rigorously demonstrated using the following model. Assume that the brightness of two adjacent tiles is the same, but undergoes an offset at the seam, as shown in FIG. 6. By performing a Fourier analysis of the resulting light intensity profile, and relating this to the resolving power of the human eye, the following equation for the threshold width of the seam, under high illumination conditions (500 nit or cd/m$^2$), is:

$$=3.5(1/1) \text{ arc sec} \quad (1)$$

where 1/1 is the relative intensity modulation at the seam. (See Alphonse, G. A. and Lubin, J., "Psychophysical Requirements for Tiled Large Screen Displays", SPIE Vol. 1664, *High Resolution Displays and Projection Systems*, 1992.) Equation 1 has been confirmed by psychophysical testing, showing that both bright and dark seams are equally visible. For a relative intensity modulation of 1 or 100%, at a viewing distance of 50 cm, Equation 1 shows that the maximum width for an invisible seam is 8.5 m for this intensity modulation. Since tiling functions cannot easily be accomplished in 8.5 m seam widths today, tiled displays cannot be constructed without special designs that drastically reduce the intensity modulation at the seam.

The techniques presented in U.S. Pat. No. 5,661,531 for designing, constructing and assembling tiled displays with invisible seams was grouped into the following six distinct categories, described hereinbelow in detail:

(1) alteration of the image plane, (2) generation of an image view plane apart from the image source plane, (3) collimation, or partial collimation, of light to prevent primary light rays from reaching the seams, (4) suppression of secondary rays emanating from the gaps between the lightvalves in the pixels, (5) enhancement of the range of view angles presented to the observer by the tiled display, and (6) enhancement of the brightness of the tiled display assembly.

This invention deals with optimization of the same six categories and, in addition, deals with color richness of the individual sub-pixels in a large tiled display employing monolithic masks. The monolithic masks, preferably placed on cover and back plates, cover the seams and all dark spaces between pixels, smoothing out the appearance of optical differences between the seam areas and the dark spaces. The masks counteract the uncertainty of the locations of the edges of the tiles and their positioning accuracy, since these areas are well hidden from the collimated light. In this preferred embodiment, the blue color is now intentionally placed at the center of the three sub-pixels so that the mask never shades any of the blue area. A shift in position of the tile either covering more sub-pixel or opening more sub-pixel to the light coming through the masks changes only the intensity level of red or green colors and are easily counteracted in intensity modulation by the software and electronics. This is the current preferred embodiment but many other arrangements would suffice.

Furthermore, this preferred tiling design clusters the sub-pixels together as close as possible for the entire pixel as shown in FIG. 4. This is accomplished by moving the wiring for all columns 15 and row lines 17 to the dark space area rather than between sub-pixels. These are unique design modifications focused on improving the tiles for application to tiled FPDs and have the effect of increasing the aperture ratio. The image source plane of a tiled display is preferably designed and the masking external to the tiles is arranged so that the image appears as a uniform array of pixels with a constant pixel pitch, both in transmitted and reflected light, irrespective of the presence of the seams. For close distance viewing this arrangement may appear grainy, but for appropriate distances for larger displays, the images are better than most large display technologies.

First, therefore, all physical space required by tiling must fit into the space provided by the uniform pixel pitch determined by the monolithic masks within the tiles. For LCDs, the seam must accommodate two liquid-crystal seals, substantial tolerance deficiencies in the location of tiles one to another and possibly some space for metal interconnect for the matrix addressing of each pixel. This requirement limits the achievable minimum pixel pitch in tiled displays. Second, the space between lightvalves on adjacent tiles must be made to appear the same optically as the pixel spaces on the same tile. This can be accomplished by placing light shields and/or selected color filter patterns into the image source plane between adjacent lightvalves and by minimizing the tile to tile spacing so that these light shields almost fill the space between tiles. The non-transparent, thin film materials used for making the TFT device interconnect or CF light shields can be used for light shielding on the tile. The separate light shields noted above are preferably placed to block direct light rays from passing through the gap, and are aligned to the thin film masking within the tiles, during the process of assembling the tiles to cover and back plates. Finally, the front side optical reflectivity of all light shield layers placed into the spaces between lightvalves should be as uniform as possible. Furthermore, the light shields plus the absorption effects of the CF decrease the impact of the intense back light used in tiled displays on the light activated leakage of the TFTs.

Generation of Image View Plane

The image source plane in a flat-panel LCD is formed by the lightvalve apertures in the thin film layer underneath the optically-active liquid-crystal layer. For practical purposes, the color filter can be considered to reside in the image source plane as well, since the thickness of the liquid-crystal layer is on the order of only 5 m. Even with the state-of-the-art, high-resolution pixel pitch of 0.2 mm, this gives a height-to-width aspect ratio of 0.075 for the color elements, which produces a negligible parallax error for normal viewing conditions. However, if mask layers or aperture plates are used on the top surface of the thinnest available, upper glass sheet with a thickness of 0.7 mm, the height-to-width aspect ratio with the same pixel pitch increases to 16.5. This results in an unacceptably large parallax error, unless the image source plane is viewed close to the direction of the surface normal. In order to avoid this parallax problem, the image source plane must be projected into a separate image view plane, which must be generated from the image source plane using a number of well-known optical techniques. This allows the CF if desired to be proximate the image view plane in alternative assembly embodiments.

First, as noted above, the seams are hidden from direct view by placing a monolithic face mask on the common coverplate over all seams and dark spaces between pixels. Preferably the cross section design will minimize the distance between the mask and the tiles. This may be achieved by placing the polarizers on the outside of the cover plate and back plate surfaces and by placing the masks on the inside surfaces as close to the tiles as the composite adhesive system 40, 41 allows, as shown in FIG. 6. The composite adhesive thickness is preferably minimized between cover plate and tiles, and between back plate and tiles. Furthermore, it is preferred that the tiles are made with 0.7 mm or thinner glass to minimize the seam area and to improve the limiting optical angles. It is desirable to cover the gaps between the lightvalves on the same tiles, as well, with the same face mask, in order to match the light reflection characteristics with those of the seam gaps, and in order to control secondary rays, as described hereinbelow.

Second, optical elements can be used to perform the actual forward projection of the image. A number of optical techniques, including but not limited to arrays of refractive microlenses, holographic lenses, diffusive screens, lenticular screens and Fresnel screens can be used to perform the projection. These optical techniques can be designed to meet or exceed the typical view angle requirements of state-of-the-art AMLCDS. Since the image quality of the tiled display depends on this projection, care must be taken to maintain a uniform focus and contrast over the entire area of the display.

Collimation of Primary Rays

The primary rays should preferably be limited, so that they do not pass through any structures used for tiling, when passing through lightvalves adjacent or close to the seams.

The placing of a monolithic black mask behind and in front of this seam "hides" it from view, thereby rendering the display seamless in a forward direction, within defined angles. A seamless display at large angles is created, however, when light is collimated to the extent of minimizing the primary and secondary light in the seam area.

FIG. 6 shows a cross-section of a particular functioning embodiment of such a display. The display is illuminated by a collimated light source, not shown. Light enters the display through a polarizer, then a rear mask, the LCD tile panels, a front mask, a front polarizer, and finally a diffusion screen located at the image view plane.

Figure 7:
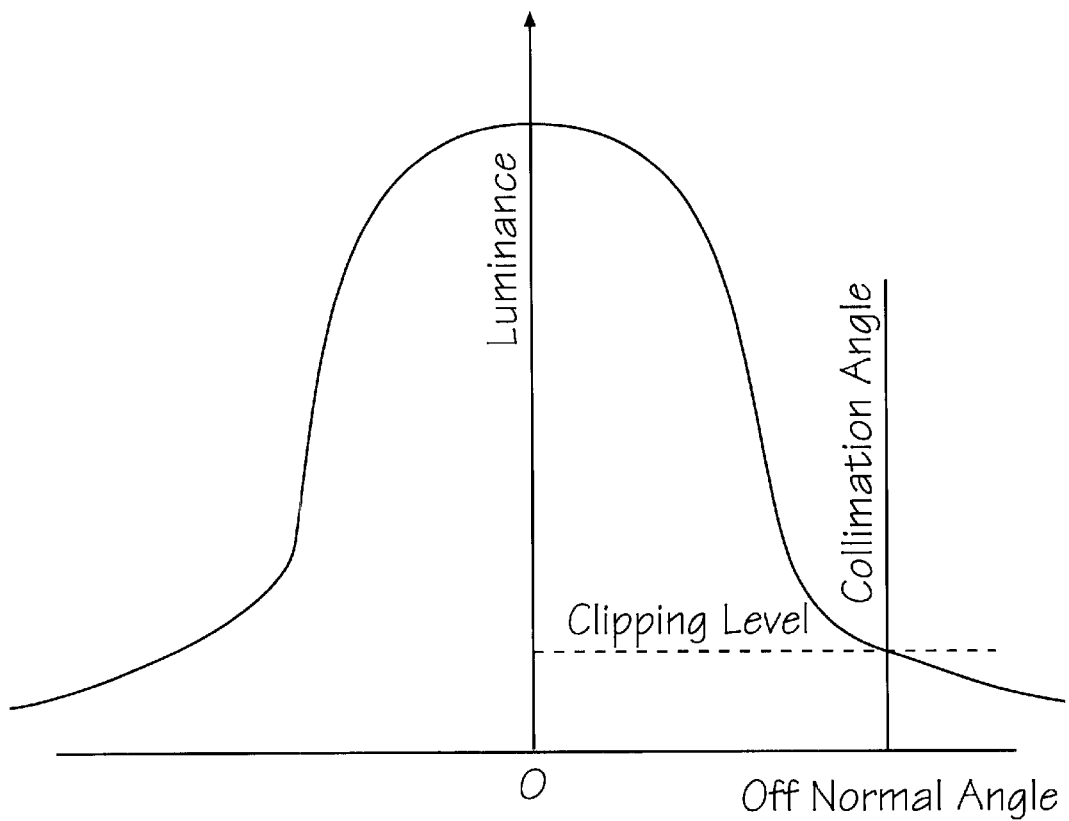
FIG. 7 is a graph of intensity versus light distribution for the light source to be used with a tiled display.

FIG. 7 shows a measured example of a practical collimated light source. Maximum brightness occurs at normal incidence, with increasing attenuation at increasing "off-normal" angles. A preferred allowable clipping level is established, which then defines the collimation angle for a particular angular distribution of light coming from the back light behind the masks.

Figure 8:
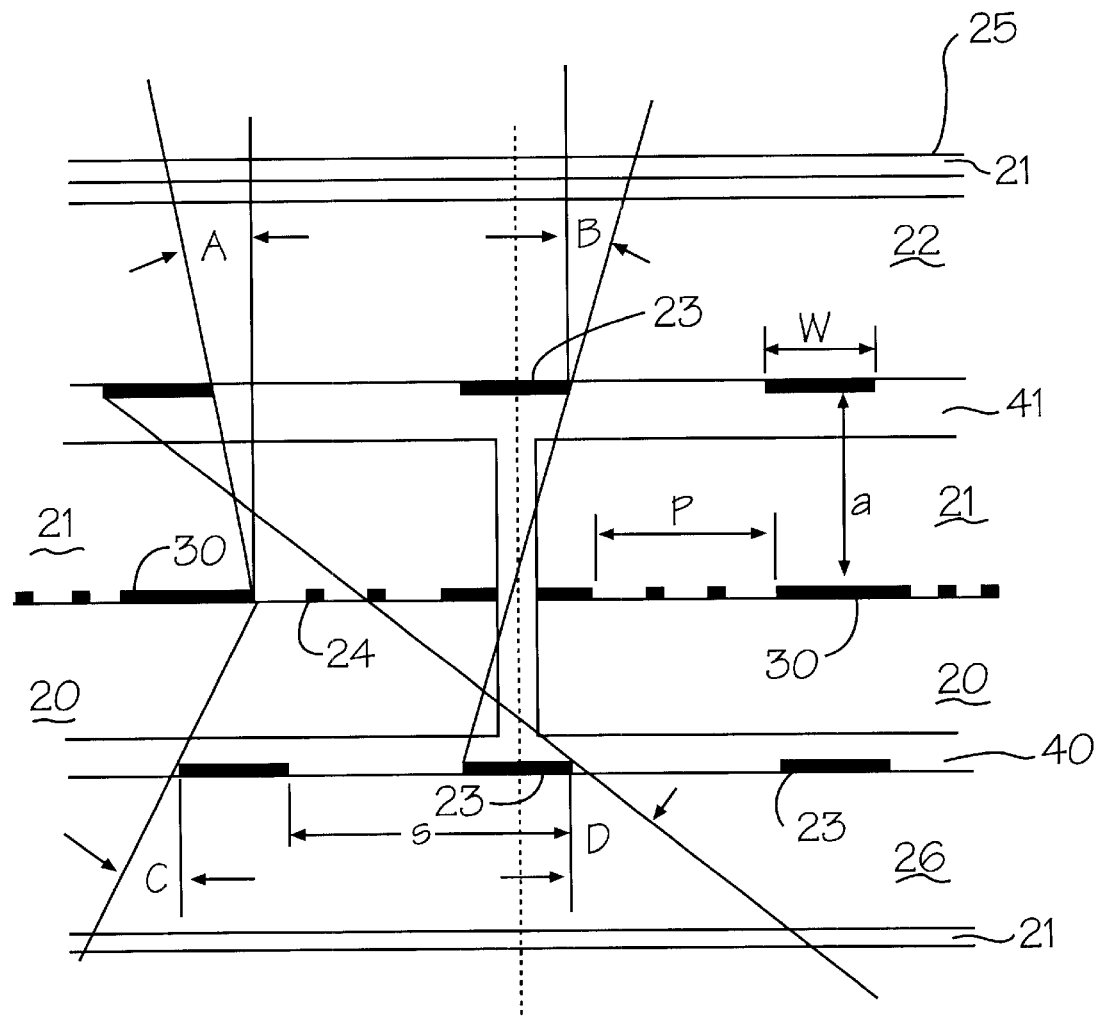
FIG. 8 shows a schematic diagram of the limiting angles of light rays passing through pixels and seam areas in the FPD prototype of the current invention.

FIG. 8 shows a cross-section (not to scale) of physical dimensions in the display. Several angles can be derived from these dimensions. These angles have visual significance for seamlessness, shadowing, resolution, cross talk and light transmission efficiency to the viewer. If the collimated light entering the display exceeds limiting angles, these parameters are affected.

Perfect seamlessness is accomplished by complete blockage of the light entering and exiting the display by the front and rear masks near the seam. This technique requires an illumination source with a clipping level of zero at a collimation angle defined by "A". Larger angle A, which improves the case of achieving a seamless appearance, increases with increasing mask line width, increases with decreasing tile thickness, and also increases with decreasing adhesive thickness between the cover plate or back plate and the tiles. The light passing through angles, greater than A is also substantially blocked by the combination of the two polarizers, the collimating efficiency of the optics behind the mask and the light blocking efficiency of the structure in the seam area.

In a practical sense the clipping level shown in FIG. 7 need not be zero; a lower limit of light, not detectable through the seam, is determined by a percentage of the light permitted through a pixel when it is in the black state. This state is determined by the contrast of the polarizers blocking the light entering and exiting the seam and the depolarized secondary light rays caused by internal reflections for rays that have passed through the front polarizer. For this reason, the adhesive material between the glass plates is chosen to be substantially equal in index of refraction to that of glass. However, secondary rays may also result from internal reflections from the color filter dark areas, side walls of the tile enclosures and from non-collimated, secondary light entering from the front face of the display. Furthermore, the glass sidewalls in the seam area may be damaged to depths of several light wave lengths, i.e., in the range of a micron, also causing diffracted rays.

The rear mask casts a shadow on the pixel if the collimated light exceeds the angle defined by "B". Larger collimation angles, and more efficient lighting, result from using thinner tiles and thinner adhesive layers. Light exceeding angles B directly affect the color balance of the light exiting the display. If a collimation angle greater than "B" is chosen, the sub-pixel sizes, spectral content of the illumination source and spectral effects of optical components must be compensated for in order to produce a good "white" state. In addition, placement error tolerances of the rear mask to the pixel cause color shifts and imbalance between adjacent LCD panels, terminating at the seam, thereby adding to the visual detection of the seam.

Perfect resolution occurs when all of the light entering a rear mask aperture illuminates only one pixel. This is defined at a collimation angle of "C". If the collimation angle exceeds "C", the image produced at a pixel is projected into the adjacent pixel's aperture in the front mask, thereby affecting contrast.

One type of cross talk is defined by resolution. Another type can be defined as the limit where light from an adjacent rear mask aperture cannot exit the opposing adjacent front mask aperture. This is defined as angle "D". In reality, the collimation angle defined by adequate resolution or cross talk (angles C and D) can be practically larger since light must travel through a greater LC distance, which has less optical transmissibility.

A practical collimation angle for a tiled seamless display lies between angles C and D. The diffusion screen location relative to the other geometry can also affect seamlessness favorably by defocusing the image of the seam. In the ideal case the projected pixel images should not overlap but should fill the projected image plane. An overlap produces a light colored seam, while an underlap will create a dark seam. In the current design, the important angles are controlled by the masks and by a method of collimation which can be varied conveniently to achieve practical cut off angles as described in a copending patent application. In addition to the collimation of primary rays, the optical elements help to suppress secondary rays and enhance image contrast and focus.

The light transmission efficiency is determined by the product of the efficiency of transmission through each optical element. Referring to FIG. 8, one important contribution is dependent on the aperture ratio which is approximately $p^2/S^2$, where the pixel is approximately square and where S is the pixel pitch. Therefore the seam width (S-p) is a major contribution to lighting efficiency.

Figure 9:
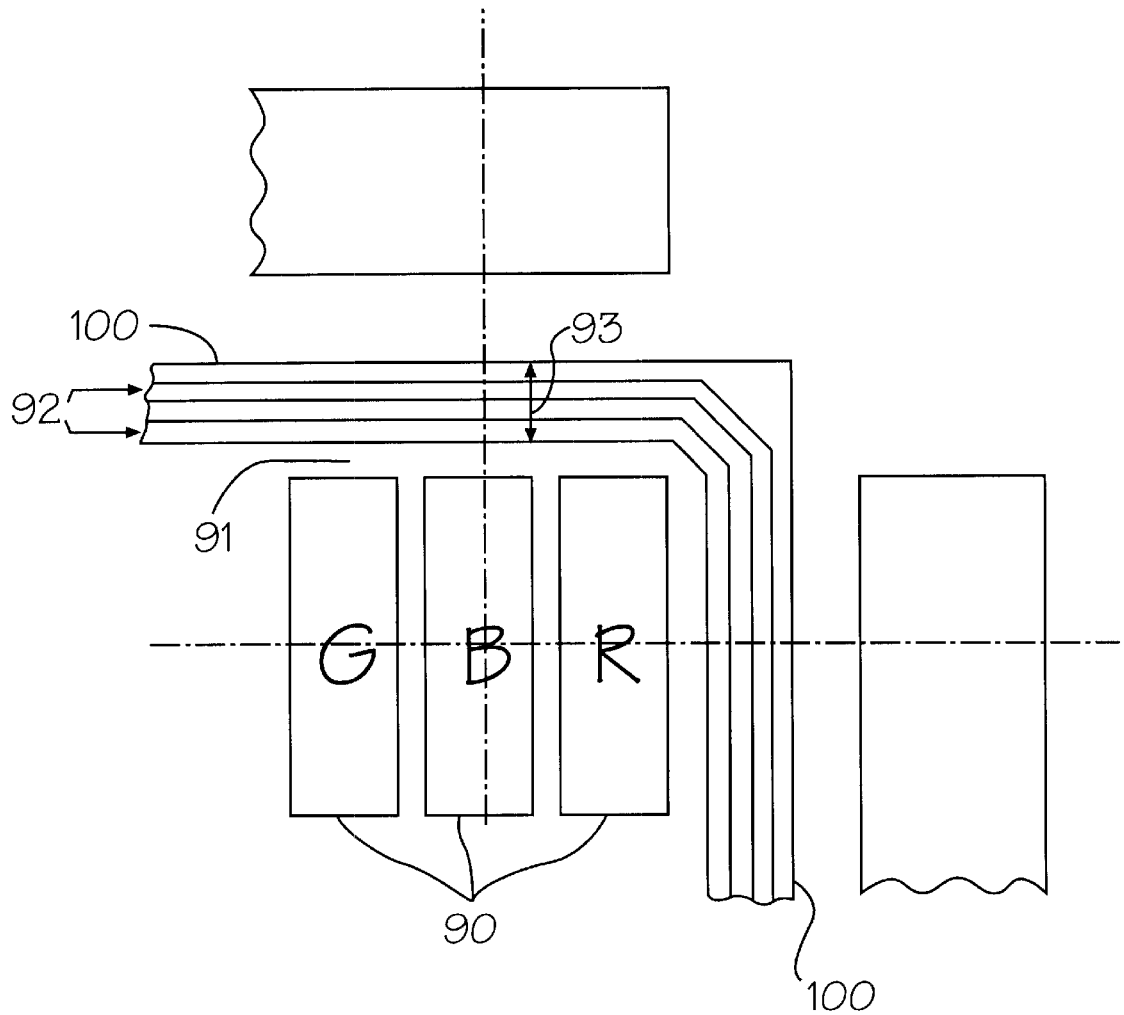
FIG. 9 depicts the location of CF dams, CF dispense pad, and CF cell gap control pads in reference to pixels and tile edges and corners near seams, showing also the approximate seal location and the outer edge of a tile that fills the area of a generation 2 manufacturing line glass substrate.

Now referring to our current functional SVGA tiled display prototype in the area of the seam, refer to FIG. 9. The allocation of dimensions is determined by the control of the seal front (inner edge). The seal front is controlled by a dam structure designed into the color filter. The dams 92 are actual vertical walls of CF with spaces between. The walls are of the order of 1 to 3 $\mu$m high or higher. The elements of the design are as follows: a) the buffer zone 91 between the pixels and the seal front adjacent to the pixels 90, b) the nominal width 93 of the seal from the front to the glass edges, c) the tolerance for location of the finished glass edges cut line 100, and d) the assembly tolerances (not shown) for tile placement relative to fiducial location accuracy of tiles with cover plates and back plates, and machine assembly location repeatability. The buffer zone (approximately 50 $\mu$m) between pixels and visible seal is experimentally determined for the seal material components; a non-visible contaminant which impacts the twisting behavior of the LC approximately 50 microns in front of the seal. The seal front location is determined by the accuracy in position of the dispense tool syringe and the control of the volume of material dispensed as well as the accuracy of the spacer ball diameter and the lamination pressure in determining the cell gap on lamination of the CF to the TFT substrate. Dispense pads of CF are located precisely in reference to the pixels and the final desired objective seal width. The dispense pad 94 is wetted preferentially by the seal, assisting in locating accurately the deposited seal material (prior to lamination). Thus, the choice of s and p is a careful design tradeoff determined by in-depth knowledge of the technology and process parameters. For example, in the current design, FIG. 9, the objective seal width is approximately 800 $\mu$m, of which an approximate objective 400 $\mu$m flows toward the pixels, and 400 $\mu$m flows away from the pixels. The approximate objective seal front resulting is about 100 $\mu$m from the pixels.

The largest portion of s-p is related to the control of the seal material and process. The choice of these nominal dimensions determines angles B, C and D, discussed above. It is desired, as noted above, to decrease s-p, optimizing these angles for minimum shadowing, maximum resolution, and minimum cross talk while maximizing the aperture ratio for light transmission efficiency.

Two problems with seal polymeric material are that it extrudes into a wavy front during lamination of the CF plate to the TFT plate, and it generally contains an active or bonding diluting liquid which readily wets the CF structure and structures on the TFT substrate. If this front extrudes into the pixel aperture area, it prevents the LC from twisting and creates a defect in the desired pixel array. In the present invention, FIG. 9, this wavy liquid front is controlled by CF dams 92 configurations spaced a precise distance from the pixels. The presently preferably used configuration is a double dam structure (FIG. 9) which is preferably spaced in coordination with the choice of seal volume and ultimate laminated seal width to be in the middle of the wavy liquid front. The seal front waviness without the dams is typically 100 $\mu$m for 800 $\mu$m width seals and is thereby decreased to less than 50 $\mu$m when the dams are present, allowing the seal to be placed substantially closer to the pixels as compared to seals that are not dammed. As a result, with dams, less space is used for the seals, allowing s-p to be small and the aperture ratio to be increased, as compared to structures without dams. The current dam design structure is one example of many which can be applied to improve the tiled display optical efficiency.

Control of the seal material at corners is described in a separately filed patent. It is also important to control the cell gap to be uniform near the tile edges.

Suppression of Secondary Rays

Secondary rays can originate either from the backside or frontside of the display. Backside secondary rays emanate from the backlight and undergo a number of refractive and reflective processes. Ambient light provides the source for frontside secondary rays. Secondary rays have complex and essentially unpredictable paths in the display stack. In addition to the uncertainty of their behavior, additional optical phenomena occur in the structures that are tiled, such as reflection and refraction at the edges of the glass plates forming the display tiles; blockage of light rays in the seal materials; line-of-sight transmission of light rays through the gap between the tiles; and waveguiding of light through the gap between the tiles. In order to minimize the intensity modulation at the seams, the inter-pixel spaces in the interior of the tiles and at the edges of the tiles should preferably be made similar, from the optical point of view.

Secondary ray effects can be managed using the following techniques: (a) inserting light shields in the lightvalve layers (thin film or color filter levels) to block all rays outside the primary-ray envelopes in the image source plane; (b) inserting light shields into the gap between each adjacent tile surrounding each tile; (c) inserting further light shields into the regions on the tiles that are used for interconnect functions at the edges thereof; (d) inserting further non-transparent regions into the outer, light-shield layers used for light collimation, so as to block direct rays from passing through the display stack regions between lightvalves on the tiles or in the seams; (e) preparing the edges of tiles to well-defined optical characteristics to influence edge-scattering of light, for example, by making them fully transmissive, fully reflective or diffusive; (f) filling the gaps between back plates and the tiles 40 and the gaps between the cover plates and the tiles 41 with an index-matching, optically-transparent compound; (g) inserting a face plate pattern on the bottom surface of the cover plate, with opaque patterns above all regions not overlapping lightvalves in the image view plane, whether on the tiles or atop the seams therebetween; and (h) inserting light shields into the areas used for interconnection on the backplate or on tile carriers.

Techniques in (a) block direct light rays from passing through the regions between the lightvalves in the image source layer. The technique (b) is preferably used in order to block line-of-sight rays from passing up through the gap between the two vertical faces of the tile plates, and to match the gap light transmission with that of the spaces between the lightvalves on the tiles. Technique (c) is also needed to match the optical transmission characteristics of the interconnect areas to the gaps between lightvalves in the interior of the tiles. The addition of matching light shields in (d) is effective both for the partial collimation of primary rays and the blockage of stray light rays. The need for technique (e) depends upon the optical quality of the edges of the tile glass plates. Scribing and cleaving, the usual way of cutting the tiles from larger sheets of glass, produces a near optical-quality surface that has a residual surface topology of more than several micrometers. Glass surfaces cut with a rotating diamond wheel may be topologically smooth, but often have a "milky" visual appearance, because of a fine surface roughness that depends on parameters of the grinding process including the grit size of the wheel. In either case, additional optical preparation of the edge of the glass can be performed, if required, using well-known techniques. The technique in (f) facilitates the lateral transport of optical-energy associated with the secondary rays across the gap between the tiles above the image source plane, in a fashion similar to that atop pixel gaps on top of the tiles. Finally, technique (g) is required to match the front surface reflectivities of seam regions with those between the lightvalves on the tiles, primarily for improved appearance in ambient light.

View Angle Enhancement of Tiled Display

While collimation or partial collimation helps to focus primary light rays into channels passing through the lightvalves, it limits the front side viewing angles to a rather small, solid angle from the surface normal. In contrast, single-user electronic displays often are required to sustain a viewing angle distribution of ±30° and multi-user displays of up to ±70° from the surface normal. Therefore, the view angle distribution limited by collimation may be enhanced, depending on the intended application. This can be accomplished by inserting an array of lenses, or, in the current preferred design, by inserting a dispersive screen into the view plane. The lens array may consist of refractive microlenses or holographic microlenses, and it can be made using microfabrication techniques. The lens array or screen may reside on a separate transparent plate or, alternatively, it can be integrated into one of the existing glass sheets used in the tiles or the cover plate.

Brightness Enhancement of Tiled Display

The second problem arising from collimation or partial collimation of the primary rays is that collimation tends to limit the amount of light collected by each lightvalve and consequently reduces the brightness of the display. For example, if aperture plates are used for collimation, the total light flux is reduced in proportion to the aperture ratio of the light shield facing the backlight source. Since reduced-brightness displays require low ambient light viewing conditions, the brightness may have to be enhanced. This can be done in several different ways. The intensity of the backlight source itself can be increased by boosting the electrical energy input or by using a greater number of light sources and/or reflective light concentrators. Alternatively, the efficiency for collecting the backlight into the collimated light channels can be increased by using microlens or holographic lens arrays, or other optical devices. These optical elements can be placed between the backlight source and the image plane of the display as described in U.S. Pat. No. 5,661,531.

This invention covers all techniques discussed above, and all of their combinations, for designing, constructing and assembling seamless, tiled, flat-panel displays. Which of these techniques or combinations thereof are used for a given, tiled display depends on the aperture ratio, the fraction of the pixel pitch allocated for tiling functions, the assembly techniques, the specifications of the display and the viewing conditions. In order to clarify such combinations, this specific, preferred embodiment employs concepts that allow the placement of structures both in front of and behind the view plane, in order to make the seams appear invisible, under normal viewing conditions intended for the tiled display. This embodiment is useful for tiled displays having larger viewing angles and a medium-to-large view-plane-to-image-plane distance and pixel pitch ratio.

The specific, preferred embodiment of the seamless, tiled display of this invention is illustrated with a scaled cross-sectional view in FIG. 6. The seamless display 154 comprises an image source plane 24 composed of a lightvalve aperture layer 18 and a color filter layer in close proximity. The tiles are formed by the top and bottom glass layers 20 and 21, respectively. The inter-tile space 160 is covered by an inserted light shield layer 23. The intra-tile pixel gaps are covered by an opaque, thin-film, lightshield layer 30.

The space between the tile glass sheets forming two adjacent tiles and the spaces 40 between back plate and tiles and cover plate and tiles 41 are filled with a transparent material having an optical refractive index closely matched to that of the glass tiles.

A light blocking monolithic mask layer 23 covers all inter- or intra-tile lightvalve gaps between adjacent pixels. This gives the seam regions the same appearance as the lightvalve gaps on the tiles, in reflected light. A screen microlens array 25 is placed on top of the glass cover plate, or it is integrated therein. The screen microlens array generates the image view plane and enhances the view angle distribution. Lightshield layers 23 are also used for further collimating the light emanating from the collimated backlight assembly.

The amount of light collimation can be controlled by shaping and sizing the apertures in the light shield layers so that the divergence of the rays passing through the image plane produces the desired view plane characteristics. The spacing of the light shields from the image plane also affects the light ray distributions; they are chosen so that the desired degree of collimation is achieved. A commercially available microlens array 168 for focusing light rays from the diffuse backlight assembly into the partially collimating light apertures of the display stack has been in attached to, or integrated into, the lower surface of the bottom glass plate facing the light source, in order to boost the brightness of the display.

Having described the principal design factors in a vertical plane and the effect of the horizontal plane dimensions in determining critical angles for optics that are significant in creating a monolithic seamless appearance with good human factors including view angle and contrast, it is now equally important to show the design configurations in the horizontal plane which allow practical aperture ratios, pixel densities, and sealing configurations and are efficient for production of tiles in a typical AMLCD manufacturing line.

Consider an example of a design (FIG. 11a) which uses the full panel size in a generation 2 AMLCD manufacturing line, which typically employs glass panel sizes in the range of 22 inches diagonal. A tile containing 400×300 pixels with a pitch of 0.98 mm can be manufactured on this sized panel. Four such panels tiled in a 2×2 configuration (FIG. 12) produce an approximately 40 inch diagonal FPD with active area resulting in an SVGA standard (800×600 pixels). For comparison, a slightly smaller pixel pitch of 0.85 mm in a slightly larger tile, still fitting within a generation 2 manufacturing line panel, could be used to make an XGA FPD with 1024×780 pixels. Both of these designs make very efficient use of the area of a generation 2 panel. The XGA tile will require more tightly held tolerances, seals decreased in width by about 25 $\mu$m and tile edge location tolerances reduced by about 15 $\mu$m to maintain aperture ratios closely equal to those for the SVGA FPD. Alternatively, a small decrease in aperture ratios will ease the tolerances for the XGA design.

It should be understood that the inventive apparatus and/or methods are not limited to the pixel densities disclosed hereinabove, but may be applied to panels of any range of pixel densities. In addition, the disclosed pixel densities all fall in a 4×3 aspect ratio. The invention may also be applied to tiles of other aspect ratios such as the 16×9 aspect ratio defined for high-definition TV (HDTV). Furthermore, tiles may also be produced in larger sizes incorporating greater numbers of pixels on larger substrates.

For example, it is anticipated that improvements in epoxies, dispensing techniques, tile size, seam fabrication techniques, and epoxy flow control structures will allow pixel counts in the range of 1600×1200 for tiled flat-panel displays.

Figure 11A:
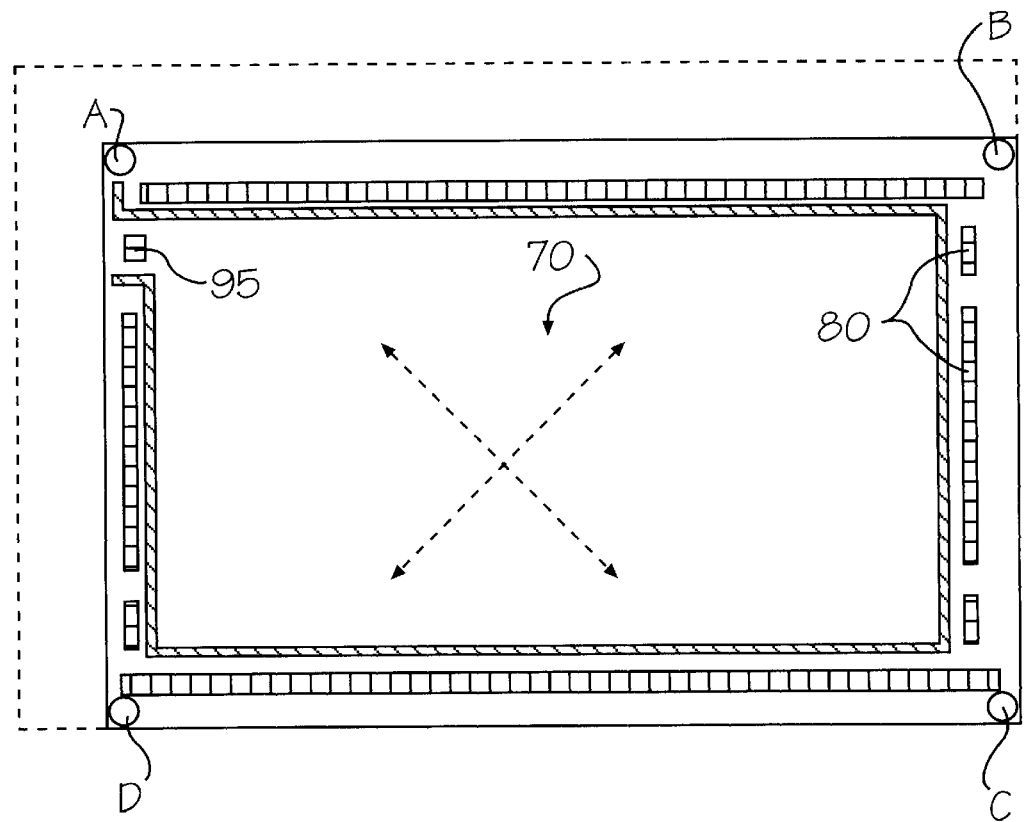
FIG. 11a is a schematic, composite view of a single color filter substrate showing four possible LC fill port locations and four different rubbing directions allowing configuration as one of four different part numbers in a tile array, depending upon the chosen seal-dispense pattern.
Figure 11B:
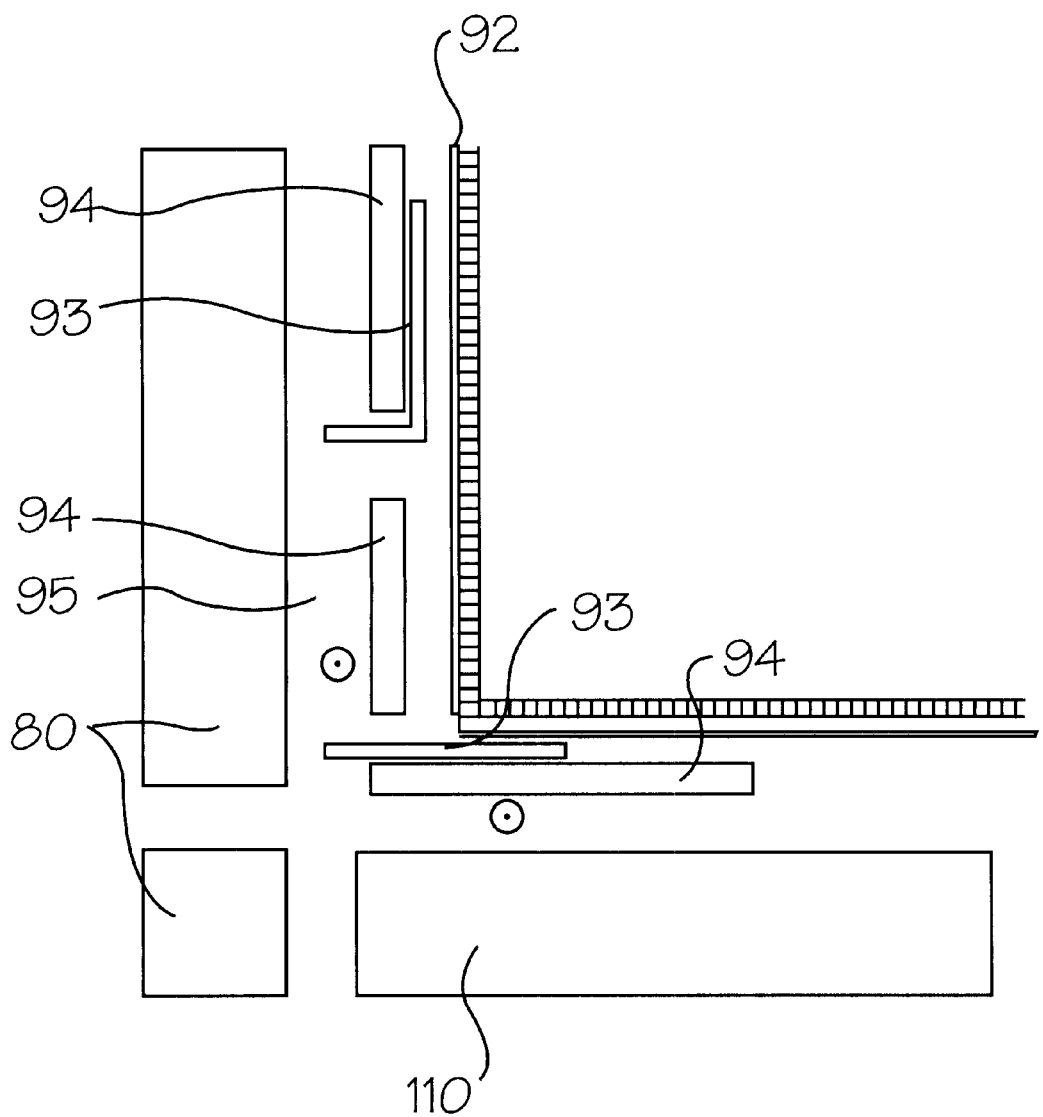
FIG. 11b is a detailed, schematic view of a portion of the composite color filter shown in FIG. 11a, showing a corner seal configuration for an "A" color filter configuration.

Disclosed herein FIG. 11a is a color filter design external to the active area which is common for the four different tile part numbers to be used in a FPD with a 2×2 array of tiles. The rubbing direction for the polyimide 70, which orients the liquid crystal, and the location of the fill port 95 are unique to each of the four part numbers to be tiled. The location for the seal 93, the port for filling LC 95, the dams 92, and the dispense pads 94 are shown in plan view in FIG. 11b specifically for part number A in the wide seal area. This is a magnified view of the wide seal corner of FIG. 11a with the seal 93 shown as it is deposited to define part number A. The fill port 95 is a gap left in the seal 93 perimeter near the corner. The seal is drawn between the CF dispense pads 94 and the CF areas 80 used in cooperation with spacer means 110 to control cell gap. The wide seal corner shown here is opposite the narrow seal corner.

Figure 11C:
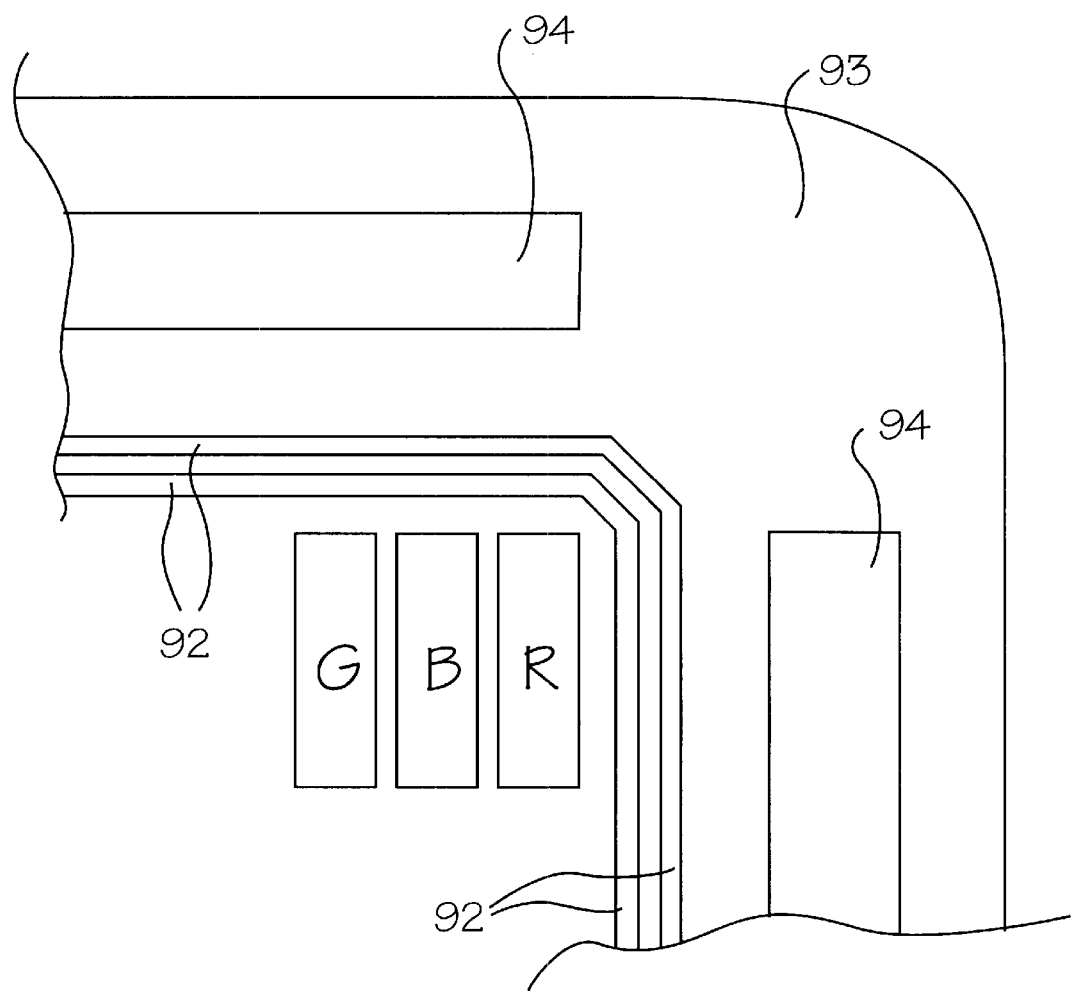

Referring now to FIG. 11c, there is shown a detailed view of the narrow seal corner opposite the wide seal corner (FIG. 11a) of the composite color filter shown in FIG. 11a. This view of the narrow seal corner for part number "A" also shows the seal location after the CF substrate and the TFT substrate for part number A are squeezed together. The CF dispense pads are eliminated in the narrow seal corner and in all other corners. The reason for this design is to balance the increase in width due to the extra seal per unit length deposited as the syringe changes direction in rounding a corner. The volume of CF eliminated is the width×length× height of the CF and this is designed to match the extra volume deposited at a corner.

A second factor in determining corner shape is due to the momentum of the dispense platform causing an overshoot. For these narrow seal designs the dispense speed is decreased to the minimum allowed by the dispense machines. This allows the achievement of a smaller radius at the corner.

Figure 11D:
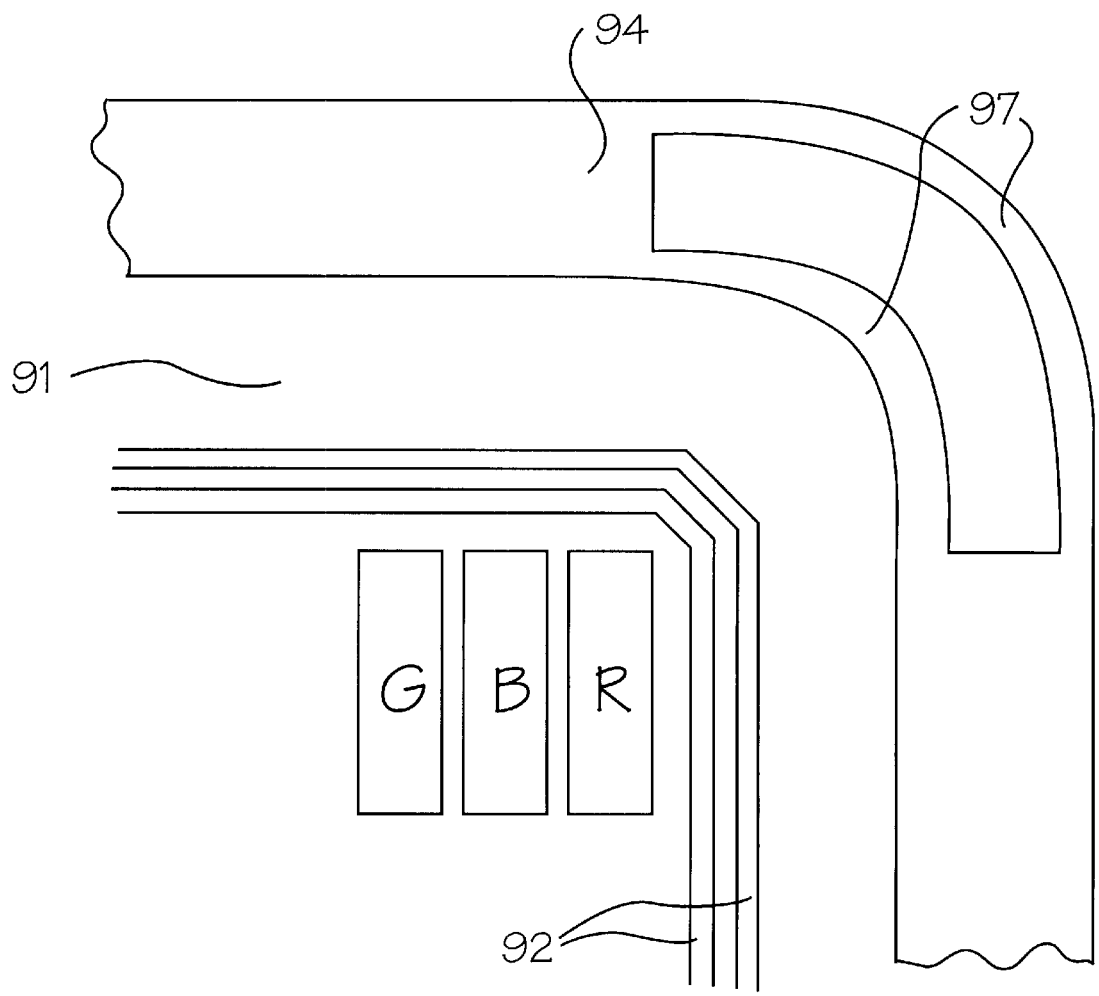
FIG. 11d is a detailed, schematic view of a narrow-seal (no fill port) corner of the composite color filter of FIG. 11a, showing narrow dam structures attached to dispense pads.

Still another factor in determining corner shape of the seal is the adhesive strength of the seal as the syringe effectively pulls the adhesive around a corner. A preferable design for decreasing this effect is shown in FIG. 11d. In this design, narrow dams linked to the edges of dispense pads have the effect of centering the position of the seal at the corners after deposition and prior to squeeze.

Figure 12:
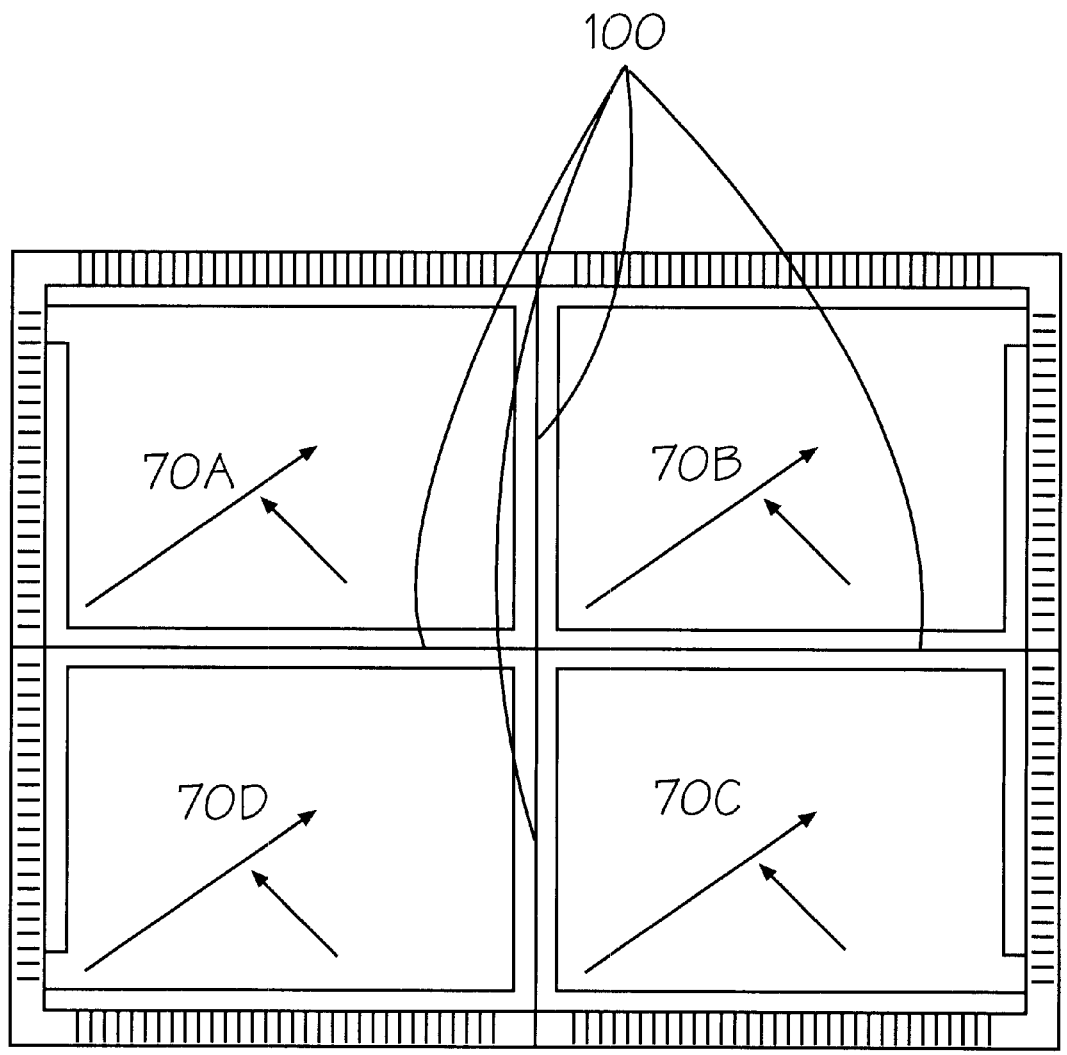
FIG. 12 is a four tile FPD layout showing the seal configured for each port with seal ports configured for LC injection.

Referring now to FIG. 12, the cut line 100 is the final determination of the tile type A, B, C or D for the CF substrate. These concepts of a common CF part number are used in the current prototype 2×2 tile array FPD and are applicable to 1×2 and 2×N arrays with some design modifications.

In the case of using a single part number for the CF, there are two different wiring patterns for the TFT substrate, one of which is shown in FIG. 4. This preferred alternative uses only two different TFT part numbers (A=C) and (B=D). Alternatively, each tile CF and TFT substrate may be uniquely designed. The rubbing directions for the TFT substrates are orthogonal to those for the CF.

The CF designs outside of the seal, with the CF profile height equal to the CF height in the areas containing the pixels (FIG. 10), assists in maintaining the cell gap uniform in the area of the seam during lamination. The cell gap may be varied by using a choice of different sized spacer spheres 110 of glass or polymer in the seal material, as compared to those in the active area. This cell gap is maintained by the mechanical strength of the seal material even after the dummy CF is cut away. Without a uniform cell gap across the seam, gray scale color changes may be visible in the seam area. The small differences in cell gap and TV curve response may be corrected near the seam.

There are several design configurations of the CF that are instrumental in controlling the waviness of the seal front and the position of the seal. Shown in FIGS. 9 and 10 is the CF pad 94, used to receive the epoxy seal material as it is dispensed. This CF is readily wetted by the epoxy and thereby establishes the initial mean location of the dispensed material more precisely than does the location of the syringe dispensing the seal. This pad is designed in width (270 microns) to match the width of wet seal material seeking its equilibrium position, due to surface tension, so that no excess material overflows the pad. The pad thereby defines a highly accurate location for the dispensed seal material. The pad is also designed to be a precise distance from the pixels, depending on the seal width desired. For example if the seal front is desired to be a nominal distance of x microns from the pixels and the half width of the seal is y microns, the center of the CF dispense pad is placed at x+y= approximately 500 microns from the pixels.

As the seal is squeezed out, the front becomes wavy, typically in the range of ±50 microns amplitude from the seal front mean position, for seals in the range of 800 microns in width. The waviness increases by about 10 microns or more for each additional 100 microns of width. Random neck downs in the seal increase with seals that are narrower than 800 microns. Therefore it is preferred to use seal widths in the 800 to 840 micron range to maintain a compromise between waviness and neckdowns. In addition to the waviness, a defective area appears, due to unknown material (probably the reactive solvent which combines molecularly with the epoxy) that contaminates the polyimide surface a measured distance approximately 50 microns in front of the visible seal material for the commonly used seal materials. The affect on the response of the liquid crystal is obvious only when the pixels: that are contaminated are switched or viewed carefully with polarizers and analyzer rotations. CF dams placed assiduously decrease the seal waviness and to some degree also appear to decrease the defective area noted above.

A dam design that works effectively is shown in FIGS. 9 and 10. In this case, as discussed above, the seal front is chosen to be 80 microns from the pixels (50 microns to allow for the defect area and 30 microns to allow for the waviness). The mean seal front is designed to be disposed between two dams, providing the smoothing of the front by wetting action along the dams and blocking of the liquid front by the dams. The defect area is therefore maintained at a safe distance from the pixels. In this design, lack of control of volume of seal equivalent to a width of approximately ±40 $\mu$m is still acceptable for maintaining clean pixels for the objective seal width of 800 to 840 $\mu$m.

These CF designs are key to minimizing the dark space needed between the pixels at the tile edges and to controlling the seal front to prevent contamination of the pixels. Once these design parameters are chosen, the total space required at the edge can be calculated based on assembly location accuracy (about ±25 microns, currently), glass edge location accuracy, and seal width required for strength and for preventing leakage. In the current design example, the outer edge of the seal is chosen to be nominally at 200 microns from the pixels. This is the intended cut or scribe and break line to meet the tolerances required for final assembly. Thus, the allocation for location tolerances and the outer glass edge distance from the pixels for the two neighboring tile edges sums to approximately 420 to 450 microns. Then the design for the tiled display evolves depending on the choice of density standard. In the example discussed herein, a tiled panel with SVGA density requires tiles to contain an array of 400×300 pixels and fit within the area of a generation 2 glass panel. A certain amount of space outside of the pixels at the edges of the panel is required for attachment of electronics, jigging and fixtures for sealing, scribing, breaking, etc. A convenient compromise size active area is 11.58"×15.55" which will contain the 400×300 pixels with pitch of 0.98 mm. The dark space for all of the pixels is chosen as noted above. This is equal to the dark space of 420 microns between pixels on neighboring tiles. Since a monolithic mask covers all four tiles and electronics are used to balance color and intensity across the seam, there is less requirement for precision as compared to a design where the tiles are butted against each other. There is a desire, however, to minimize the dark space and maintain an aperture ratio for the highest practical light transfer efficiency. With.this design it is also possible to decrease the seam space and improve seamlessness as the cutting and assembly tolerances are improved.

In the sequence of processing the TFT substrate and the CF substrate components of the tile making them ready for the assembly operation a thin film of polyimide is deposited on each substrate. As shown earlier there is a particular rubbing direction for each substrate defining the part number A, B, C, or D. When the tiles are later assembled into an FPD, the rubbing directions line up so that they are all in one direction for the TFT and in the orthogonal direction to that for the CF. A unique problem arises from these rubs at the tile level in that half of the tiles are rubbed from the narrow seal side while the second half are rubbed from the wide seal side. Rubbing is one of the most severe generators of electrostatic discharge. In non-tiled displays, the rubbing entry point may be on the wide seal side which contains protective diodes which substantially prevent damage to the internal electronics, particularly the TFTs. Unless such preventative measures are taken for the tiles on the narrow seal sides for the TFTs, there is a risk that the ESD will create damage. Therefore, a preferred design for tiling encompasses protective diodes on the narrow seal sides as well as on the wide seal sides. A second line of defense is to add redundant TFTs for all sub pixels neighboring the narrow seal sides or preferably for all sub-pixels.

Since other combinations, modifications and changes varied to fit particular operating requirements and environments will be apparent to those skilled in the art, the invention is not considered limited to the chosen preferred embodiments for purposes of this disclosure, but covers all changes and modifications which do not constitute departures from the true spirit and scope of this invention.

Having thus described the invention, what is desired to be protected by letters patent is presented in the subsequently appended claims.

What is claimed is:

1. A tiled, flat-panel display comprising an n×m array of pixels and having visually imperceptible seams, comprising:
   a) four display tiles, each comprising approximately an n/2×m/2 sub-array of pixels defining essentially identical viewing areas, the variables n and m comprising one pair from the set: 640×480 (VGA); 800×600 (SVGA); 1024×768 (XGA); 1152×864; and 1280×1024, the pixels of said sub-array of pixels comprising a pixel cell gap and substantially uniform pixel pitch, said pixel cell gaps in pixels proximate said seam regions being substantially equal to said pixel cell gaps in pixels disposed in an interior region of said sub-arrays of pixels each of said pixels of said sub-arrays having an active, central area surrounded by an inactive, dark area having a predetermined width;
   b) seam regions disposed between adjoining edges of said four display tiles for maintaining said substantially uniform pixel pitch across said seam regions, said seam regions comprising thin, perimeter seals at adjoining edges of each of said four display tiles, said thin perimeter seals having a width no greater than said predetermined width of said inactive, dark area, and said thin perimeter seals in said dark regions comprising dispense pads and dam structures formed in a color filter (CF) layer of each of said four display tiles to control the spread of a sealing material forming said thin, perimeter seals;
   c) polarizing means for polarizing light disposed adjacent to and substantially parallel to a rear surface of said four tiles; and
   d) support means disposed adjacent to and substantially co-planar with said polarizing means for polarizing light, said support means supporting said four display tiles.

2. The tiled, flat-panel display having visually imperceptible seams as recited in claim 1, further comprising:
   e) rear masking means adjacent to and substantially co-planar planar with said support means, said rear masking means affixed to said support means.

3. The tiled, flat-panel display having visually imperceptible seams as recited in claim 2, further comprising:
   f) a first adhesive layer disposed between said rear masking means and a back surface of each of said four display tiles; and
   g) a second adhesive layer disposed between said rear masking means and a front surface of said tiles.

4. The tiled, flat-panel display having visually imperceptible seams as recited in claim 3, further comprising:
   h) front masking means adjacent to and substantially co-planar with a front surface of each of said four display tiles, said front masking means being affixed to said front support surface for said tiles.

5. The tiled, flat-panel display having visually imperceptible seams as recited in claim 4, further comprising:
   i) a cover plate front support surface disposed adjacent to and substantially co-planar with said rear masking means.

6. The tiled, flat-panel display having visually imperceptible seams as recited in claim 5, further comprising:
   j) an analyzer layer adjacent to and substantially co-planar with said cover plate, said analyzer layer affixed to said cover plate by said adhesive layer.

7. The tiled, flat-panel display having visually imperceptible seams as recited in claim 6, further comprising:
   k) a screen adjacent to and substantially co-planar with said analyzer layer.

8. The tiled, flat-panel display having visually imperceptible seams as recited in claim 6, wherein said pixels comprise sub-pixels arranged in a predetermined pattern.

9. The tiled, flat-panel display having visually imperceptible seams as recited in claim 8, wherein each of said stib-pixels comprises a red, a blue and a green sub-pixel.

10. The tiled, flat-panel display having visually imperceptible seams as recited in claim 8, wherein said predetermined pattern comprises a rectangle.

11. The tiled, flat-panel display having visually imperceptible seams count as recited in claim 6, further comprising wiring selectively disposed in said inactive, dark areas of said pixels.

12. The tiled, flat-panel display having visually imperceptible seams as recited in claim 6, further comprising a fiducial structure used to locate components of said four display tiles precisely with respect to one another and with respect to said front and said rear masking means.

13. The tiled, flat-panel display having visually imperceptible seams as recited in claim 6, wherein said four display tiles are AMLCD tiles comprising a liquid crystal layer and, further, wherein said liquid crystal layer comprises spacer means.

14. The tiled, flat-panel display having visually imperceptible seams as recited in claim 13, wherein said spacer means comprises spacing spheres distributed in said liquid crystal layer.

15. The tiled, flat-panel display having visually imperceptible seams as recited in claim 6, wherein said liquid crystal layer of each of said four display tiles has an identifiable rubbing direction whereby the alignment of said liquid crystal layer is maintained in a uniform direction.

16. The tiled, flat-panel display having visually imperceptible seams as recited in claim 6, wherein said thin, perimeter seals are formed by dispensing in a predetermined pattern and location relative to said pixels.

17. The tiled, flat-panel display having visually imperceptible seams as recited in claim 16, wherein said predetermined pattern comprises at least two unique, identifiable, predetermined patterns.

18. The tiled, flat-panel display having visually imperceptible seams as recited in claim 17, wherein said at least two unique, identifiable, predetermined patterns are identified on an exterior portion of said four display tiles.

19. The tiled, flat-panel display having visually imperceptible seams as recited in claim 2, wherein said rear masking means comprises means for collimating light.

20. The tiled, flat-panel display having visually imperceptible seams as recited in claim 1, further comprising collimating means for collimating light to prevent the passage thereof through said seam regions.

21. A tiled, flat-panel display (FPD) comprising an n×m array of pixels and having visually imperceptible seams, comprising:

a) four display tiles, each comprising approximately an n/2×m/2 sub-array of pixels defining essentially identical viewing areas, the pixels of said sub-array of pixels comprising a substantially uniform pixel pitch, wherein said variables n and m comprise one pair from the set: 640×480 (VGA); 800×600 (SVGA); 1024×768 (XGA); 1152×864; and 1280×1024, each of said pixels having an active, central area surrounded by an inactive, dark area having a predetermined width, said pixels each comprising a pixel cell gap;

b) seam regions disposed between adjoining edges of said four display tiles for maintaining said substantially uniform pixel pitch across said seam region, said seam regions comprising thin, perimeter seals at adjoining edges of each of said four display tiles, said thin perimeter seals being formed from a flowable sealing material dispensed according to a predetermined process and having a finished width no greater than said predetermined width of said inactive, dark areas adjacent said seams, said thin, perimeter seals being formed using dispense pads for controlling the central location and profile of said flowable sealing material as it is dispensed, and wherein said pixel cell gaps in pixels proximate said seam regions are substantially equal to said pixel cell gaps in pixels disposed in an interior region of said sub-arrays of pixels;

c) dam structures disposed in a color filter (CF) layer of each of said four display tiles to control the spread of said flowable sealing material, said dam structures comprising stripes spaced a predetermined distance from said pixels, said predetermined distance comprising the width of a contaminating leading edge of said flowable sealing material, said width being a measurable characteristic of said flowable sealing material and said predetermined process; and d) the dispense pads proximate said dam structures.

22. The tiled, flat-panel display having visually imperceptible seams as recited in claim 21, wherein said dam structures each comprise a first, continuous dam structure extending essentially to at least one corner of each of said four display tiles and a second dam structure proximate at least one of said corners of said display tiles and said dispense pads to control the position and profile of said thin perimeter seals proximate said corners.

23. The tiled, flat-panel display having visually imperceptible seams as recited in claim 22, wherein each of said pixels in said sub-arrays of pixels comprises a pixel cell gap.

24. The tiled, flat-panel display having visually imperceptible seams as recited in claim 23, further comprising a cell gap control structure for maintaining said pixel cell gaps in pixels proximate said seams substantially equal to said pixel cell gaps in pixels disposed at an interior region of said sub-arrays of pixels.

25. The tiled, flat-panel display having visually imperceptible seams as recited in claim 24, wherein said cell gap control structure comprises at least one from the group of: dams, dispense pads, external spacers, stripes external to said pixel area.

26. The tiled, flat-panel display having visually imperceptible seams as recited in claim 24, wherein said cell gap control structure comprises external spacers matched to spacers located in the liquid crystal area of said display tiles.

27. The tiled, flat-panel display having visually imperceptible seams as recited in claim 26, wherein each of said four display tiles has a physical structure different from one another, each of said physical structures having a unique identification.

28. The tiled, flat-panel display having visually imperceptible seams as recited in claim 27, said physical structure of each of said tiles comprising a different location for a liquid crystal fill port for each of said uniquely identified display tiles.

29. The tiled, flat-panel display having visually imperceptible seams as recited in claim 26, wherein is in the range of approximately 640 to 1600 and m comprises the value of n multiplied by a constant between approximately 0.625 and 0.75.

30. A tiled, flat-panel display comprising an n×m array of pixels and having visually imperceptible seams, comprising:

a) four display tiles, comprising approximately an n/2× m/2 sub-array of pixels defining essentially identical viewing areas, the pixels of said sub-array of pixels comprising a substantially uniform pixel pitch, wherein said variables n and m comprise one pair from the set: 640×480 (VGA); 800×600 (SVGA); 1024×768 (XGA); 1152×864; and 1280×1024, each having an active, central area surrounded by an inactive, dark area having a predetermined width, each of said pixels in said sub-arrays of pixels comprising a pixel cell gap, and wherein said pixel cell gaps in pixels proximate said seam regions are substantially equal to said pixel cell gaps in pixels disposed in an interior region of said sub-arrays of pixels;

b) seam regions disposed between adjoining edges of said four display tiles for maintaining said substantially uniform pixel pitch across said seam regions, said seam regions comprising thin, perimeter seals at adjoining edges of each of said four display tiles, said thin perimeter seals having a width no greater than the said predetermined width of said inactive, dark areas, said thin perimeter seals being formed using dispense pads for controlling the central location and profile of said flowable sealing material as it is dispensed;

c) interconnection means operatively connected to each of said pixels for providing externally-generated, electrical drive signals thereto; and d) electrostatic discharge protection means operatively connected to said interconnection means for dissipating electrical charges to prevent damage to said display tiles.

31. The tiled, flat-panel display having visually imperceptible seams as recited in claim 30, wherein said electrostatic discharge protection means comprises diodes.

32. The tiled, flat-panel display having visually imperceptible seams as recited in claim 31, wherein said diodes are located inside said narrow perimeter seals.

33. The n×m-pixel, tiled, flat-panel display having visually imperceptible seams as recited in claim 31, wherein said diodes are located under said narrow perimeter seals.

34. The n×m-pixel, tiled, flat-panel display having visually imperceptible seams as recited in claim 31, further comprising a redundant transistor for controlling drive signals to at least one of said sub-pixels.

* * * * *